United States Patent
Lee et al.

(10) Patent No.: US 10,129,746 B2
(45) Date of Patent: Nov. 13, 2018

(54) MOBILE TERMINAL, HOME APPLIANCE, AND METHOD OF OPERATING THE SAME

(71) Applicant: LG ELECTRONICS INC., Seoul (KR)

(72) Inventors: Suhwan Lee, Seoul (KR); Hyoungjun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 524 days.

(21) Appl. No.: 14/845,919

(22) Filed: Sep. 4, 2015

(65) Prior Publication Data
US 2016/0073259 A1  Mar. 10, 2016

(30) Foreign Application Priority Data

Sep. 5, 2014 (KR) .................. 10-2014-0119247

(51) Int. Cl.
*G06F 15/173* (2006.01)
*H04W 12/06* (2009.01)
(Continued)

(52) U.S. Cl.
CPC ........ *H04W 12/06* (2013.01); *G06F 3/04842* (2013.01); *G06F 3/04847* (2013.01);
(Continued)

(58) Field of Classification Search
CPC ..... H04L 12/2803; H04L 41/22; H04L 47/70; H04L 61/6062; H04L 67/025;
(Continued)

(56) References Cited

U.S. PATENT DOCUMENTS

2014/0106672 A1* 4/2014 Jeon ..................... H04B 5/0031
 455/41.1
2014/0181916 A1* 6/2014 Koo ..................... H04W 12/08
 726/4

FOREIGN PATENT DOCUMENTS

KR 10-2014-0079328 6/2014
KR 10-2014-0080958 7/2014
(Continued)

OTHER PUBLICATIONS

Korean Office Action dated Oct. 26, 2015 issued in Application No. 10-2014-0119247.
(Continued)

*Primary Examiner* — Frantz Jean
(74) *Attorney, Agent, or Firm* — Ked & Associates, LLP

(57) ABSTRACT

Disclosed are mobile terminals, home appliances, and methods of operating the same. The mobile terminal may include a controller configured to control display of a screen including an application related to the home appliance in response to an input to execute the application related to the home appliance. The controller may control setting of information, related to any one access point device among a plurality of access point devices stored in the mobile terminal, for connecting to an access point device with respect to the home appliance when product registration of the home appliance is not completed when a login item is selected on the application screen. The controller may also control to transmit a media access control (MAC) address of the access point device to the home appliance based on the set information and perform product registration for the home appliance.

18 Claims, 46 Drawing Sheets

(51) Int. Cl.
*H04L 12/28* (2006.01)
*G06F 3/0484* (2013.01)
*H04L 12/24* (2006.01)
*H04L 12/911* (2013.01)
*H04L 29/12* (2006.01)
*H04L 29/08* (2006.01)

(52) U.S. Cl.
CPC .......... *H04L 12/2803* (2013.01); *H04L 41/22* (2013.01); *H04L 47/70* (2013.01); *H04L 61/6022* (2013.01); *H04L 67/025* (2013.01); *H04L 67/125* (2013.01); *H04L 2012/2841* (2013.01)

(58) Field of Classification Search
CPC ........... H04L 67/125; H04L 2012/2841; G06F 3/04847; G06F 3/04842; H04W 12/06
USPC .......................................... 709/225; 715/734
See application file for complete search history.

(56) References Cited

FOREIGN PATENT DOCUMENTS

| KR | 10-2014-0081270 | | 7/2014 | |
|----|-----------------|---|--------|---|
| KR | 10-2014-0089878 | | 7/2014 | |
| WO | WO 2013/015656 | A2 | 1/2013 | |
| WO | WO 2013015656 | A2 * | 1/2013 | ............. D06F 33/02 |

OTHER PUBLICATIONS

European Search Report dated Jan. 26, 2016 issued in Application No. 15183955.2.
Korean Notice of Allowance dated Apr. 8, 2016 issued in Application No. 10-2014-0119247.

* cited by examiner

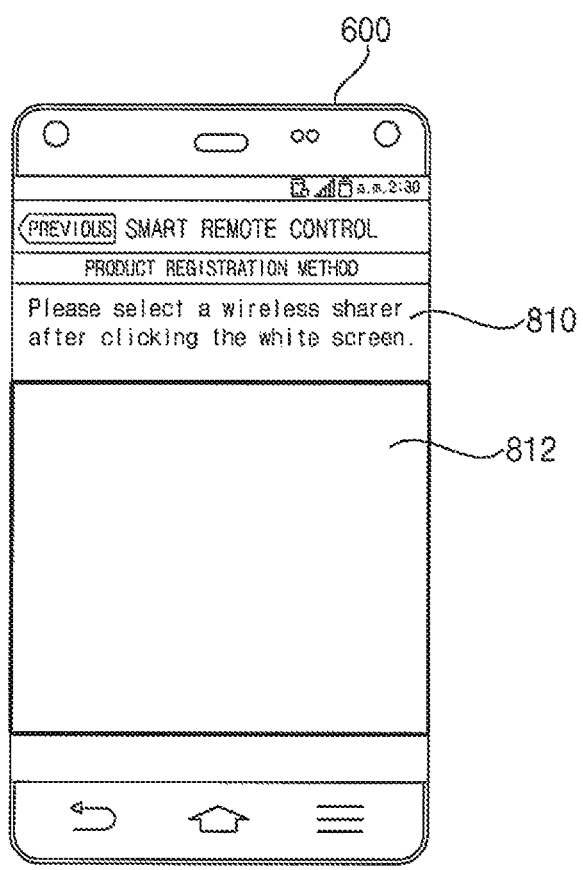

MOBILE TERMINAL, HOME APPLIANCE, AND METHOD OF OPERATING THE SAME

CROSS-REFERENCE TO RELATED APPLICATION(S)

This application claims priority under 35 U.S.C. § 119 to Korean Patent Applications No. 10-2014-0119247, filed on Sep. 5, 2014 in the Korean Intellectual Property Office, whose entire disclosure is hereby incorporated by reference.

BACKGROUND

1. Field

The present disclosure relates to mobile terminals, home appliances, and methods of operating the same and, more particularly, to mobile terminals, home appliances, and methods of operating the same, which enable simplified implementation of product registration with respect to home appliances.

2. Background

Among home appliances placed in buildings, for user convenience, refrigerators perform a food storage function, laundry treatment apparatuses perform a laundry treatment function, air conditioners perform an indoor temperature control function, and cooking appliances perform a food cooking function.

Meanwhile, with development of various communication technologies, various measures to increase user convenience via communication with home appliances have been studied. However, mobile terminals, home appliances, and methods of operating the same of the prior art suffer from various disadvantages. The present disclosure is directed to mobile terminals, home appliances, and methods of operating the same that provide a simplified and more efficient product registration with respect to home appliances.

BRIEF DESCRIPTION OF THE DRAWINGS

The embodiments will be described in detail with reference to the following drawings in which like reference numerals refer to like elements wherein.

DETAILED DESCRIPTION

Hereinafter, the present disclosure will be described in detail with reference to the accompanying drawings.

With respect to constituent elements used in the following description, suffixes "module" and "unit" are given or mingled with each other only in consideration of ease in the preparation of the specification, and do not have or serve as different meanings. Accordingly, the suffixes "module" and "unit" may be used interchangeably with each other.

Figure 1:
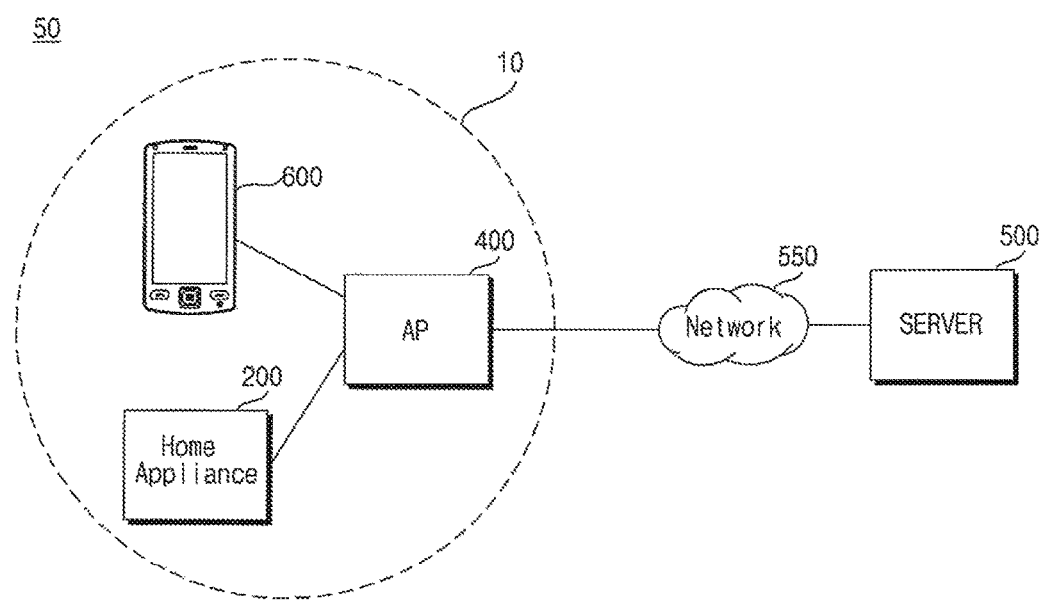
FIG. 1 is a view showing an exemplary configuration of a communication system having a home appliance according to one embodiment of the present disclosure.

FIG. 1 is a view illustrating an exemplary configuration of a communication system having a home appliance according to one embodiment of the present disclosure.

The communication system according to one embodiment of the present disclosure, designated by reference numeral 50, may include a home appliance 200, an access point (AP) device 400, a server 500, a network 550, and a mobile terminal 600.

The home appliance 200 may be an electronic device for personal use and, for example, may be a refrigerator (see 200a of FIG. 2A), a washing machine (see 200b of FIG. 2B), an air conditioner (see 200c of FIG. 2C), a cooking appliance (see 200d of FIG. 2D), a cleaner (see 200e of FIG. 2E), or any other appropriate type of electronic device.

The home appliance 200 may incorporate a communication unit therein and perform data exchange with electronic devices within a range of an internal network 10 or electronic devices that are connectable via an external network 550. To this end, the communication unit may perform data exchange with the access point device 400 in a wired/wireless manner.

The access point (AP) device 400 may provide the internal network 10 for proximate electronic devices. In particular, the access point device 400 may provide a wireless network. Specifically, the access point device 400 may assign the electronic devices within a range of the internal network 10 wireless channels of a prescribed communication type and perform wireless data communication through these channels. Here, the prescribed communication type may be Wi-Fi communication.

In this case, the mobile terminal 600, located within a range of the internal network 10, may access the home appliance 200 via the access point device 400, so as to perform monitoring, remote control, and the like with respect to the home appliance 200.

In addition, the access point device 400 may perform data communication with external electronic devices via the external network 550 other than the internal network 10. In one example, the access point device 400 may perform wireless data communication with an external mobile terminal 600 via the external network 550.

In this case, the mobile terminal 600, located within a range of the external network 550, may access the home appliance 200 via the external network 550 and the access point device 400, so as to perform monitoring, remote control, and the like with respect to the home appliance 200. In another example, the access point device 400 may perform wireless data communication with the external server 500 via the external network 550.

The server 500 may store firmware information and operation information (e.g., course information) related to the home appliance 200 and register product information related to the home appliance 200. For example, the server 500 may be a server managed by a manufacturer of the home appliance.

In one embodiment of the present disclosure, when product registration of the home appliance 200 is not completed in the mobile terminal 600, the mobile terminal 600 may set information, which is related to any one access point device 400 among a plurality of access point devices 400 stored therein, to the access point device 400 with respect to the home appliance 200 and, based on this setting, transmit a media access control (MAC) address of the corresponding access point device 400 to the home appliance 200. In this way, the mobile terminal 600 may simply perform product registration with respect to the home appliance 200.

Particularly, the home appliance 200, which has received the MAC address information, may access the access point device 400 and, in turn, access the server 500 by way of the access point device 400, which enables simplified implementation of product registration by the home appliance 200.

Meanwhile, upon transmission of the MAC address information, the mobile terminal 600 may further transmit password information of the access point device 400 to the home appliance 200, which enables the home appliance 200 to simply access the access point device 400.

Then, the mobile terminal 600 may receive a message indicating completion of product registration with respect to the home appliance 200 from the server 500 and display the product registration completion message, which enables a user to simply recognize completion of product registration. In this way, user convenience may be increased.

Meanwhile, with regard to transmission of the MAC address information, the MAC address information may be encoded MAC address information. In this case, the mobile terminal 600 may add a fixed-length packet to a packet header, or may externally transmit a plurality of packets including the MAC address information, the packets having different lengths, which enables the home appliance 200 to easily grasp the MAC address information.

To transmit the MAC address information, the mobile terminal 600 may transmit a starting signal for a prescribed duration of time and, after transmission of the starting signal, transmit a message including the MAC address information using any one wireless channel among a plurality of wireless channels, which enables the home appliance 200 to easily receive the MAC address information.

In one embodiment of the present disclosure, once the home appliance 200 has received the MAC address of the access point device 400 from the mobile terminal 600, the home appliance 200 may simply perform product registration by receiving identifier information, encoding method information, and authentication method information from the access point device 400 based on the MAC address information, controlling access to the access point device 400 under control using the received identifier information, encoding method information, and authentication method information, and transmitting product information to the server 500 by way of the access point device 400.

Particularly, the home appliance 200 may request, based on the MAC address information, that the access point device transmits the identifier information, encoding method information, and authentication method information, or may receive the identifier information, encoding method information, authentication method information from a beacon signal transmitted from the access point device 400. In this way, the home appliance 200 may easily access the access point device 400.

When the mobile terminal 600 transmits encoded MAC address information upon transmission of the MAC address information, the home appliance 200 may easily acquire the MAC address information by removing a fixed-length packet from a packet header of a received starting signal and decoding the packet header from which the fixed-length packet has been removed.

The above-described operation of the mobile terminal 600 and the home appliance 200 for product registration of the home appliance 200 will be described below in more detail with reference to FIG. 7.

FIGS. 2A to 2E are views illustrating various examples of the home appliance shown in FIG. 1.

Figure 2A:
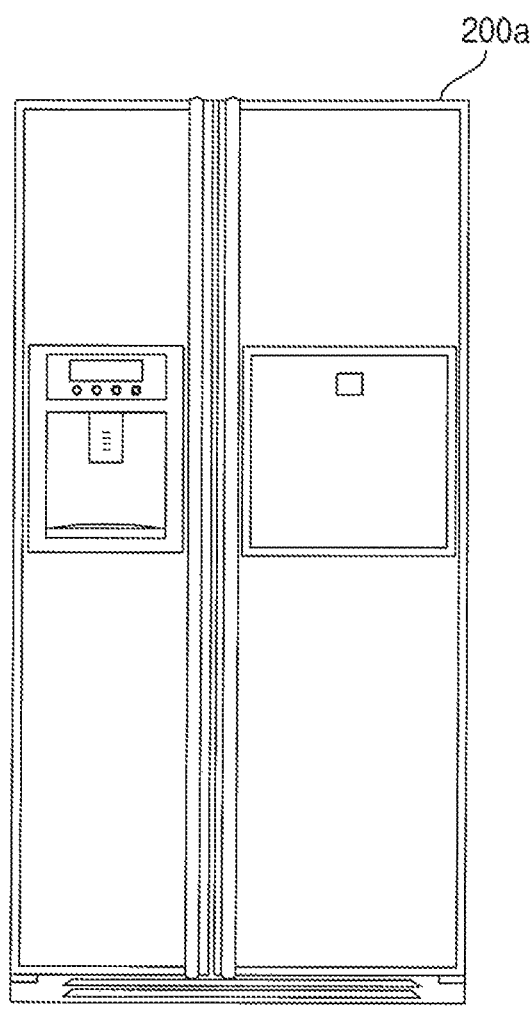
FIGS. 2A to 2E are views showing various examples of the home appliance shown in FIG. 1.
Figure 2B:
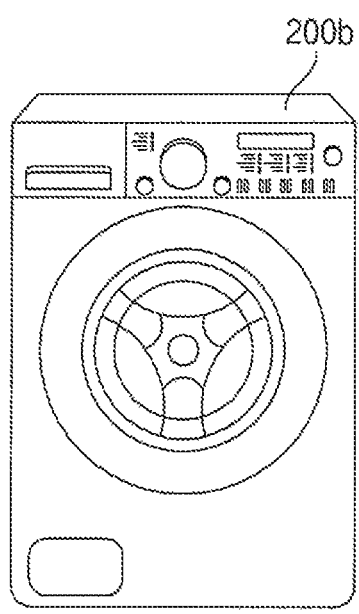
Figure 2C:
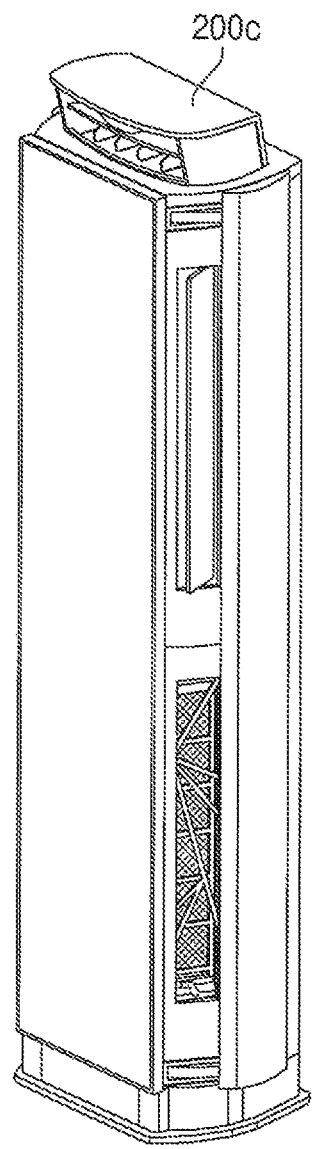
Figure 2D:
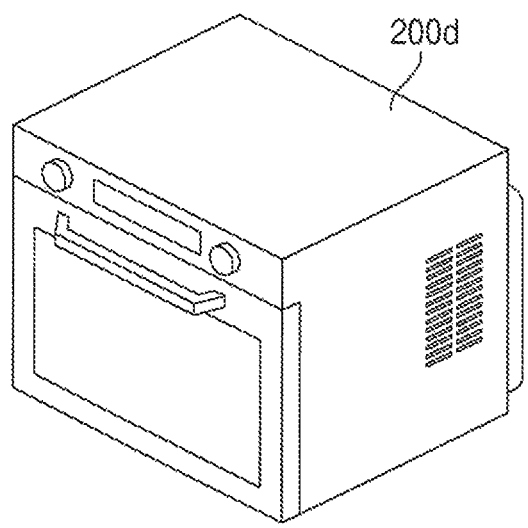
Figure 2E:
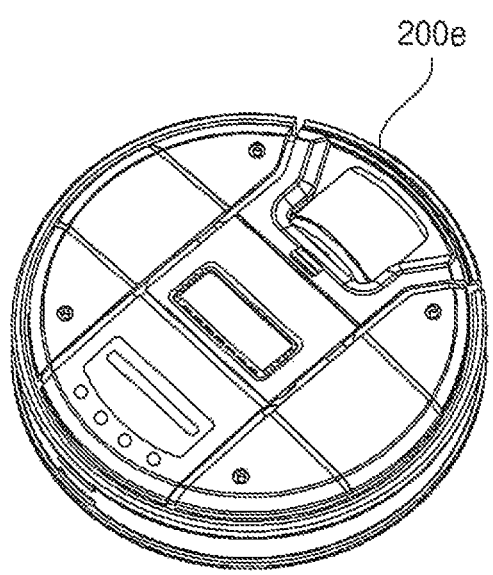

FIG. 2A shows a refrigerator 200a, FIG. 2B shows a washing machine 200b, FIG. 2C shows an air conditioner 200c, FIG. 2D shows a cooking appliance 200d, and FIG. 2E shows a robot cleaner 200e.

Figure 3:
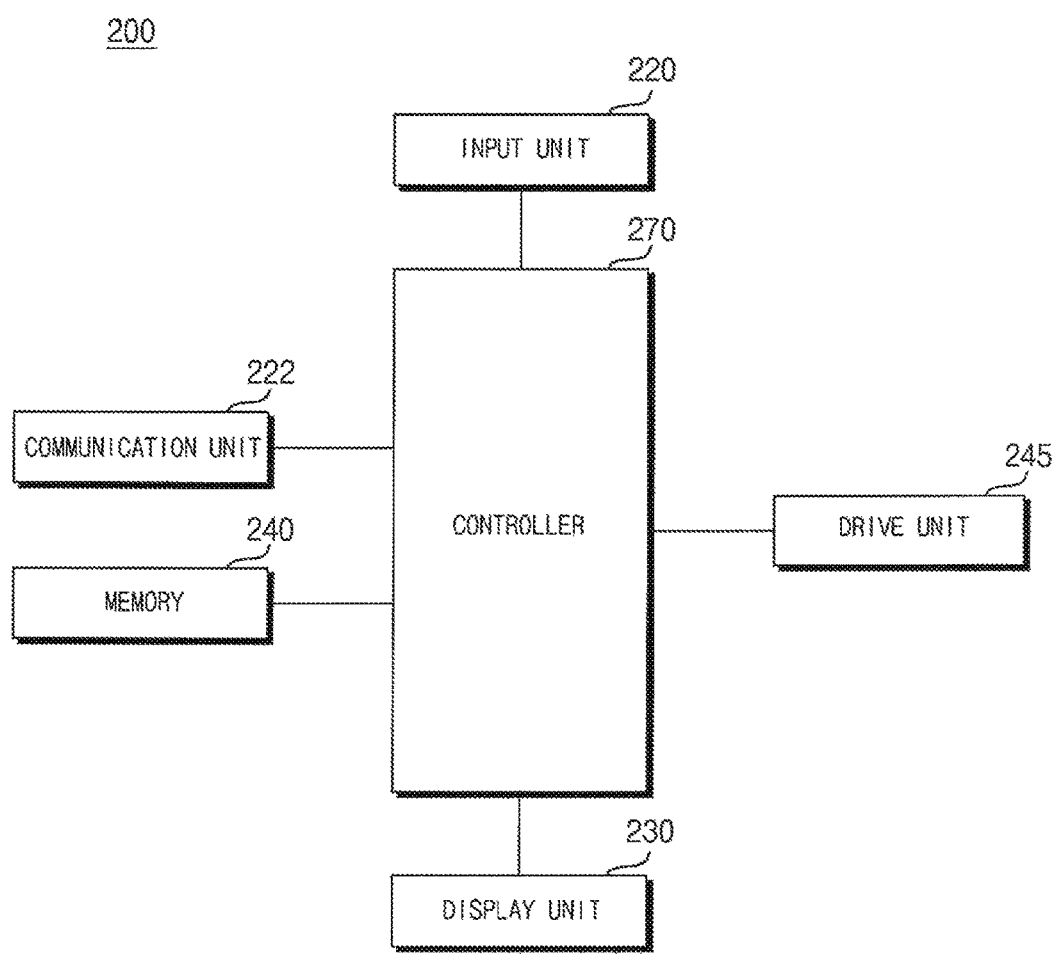
FIG. 3 is a schematic block diagram showing an inner configuration of the home appliance shown in FIG. 1.

FIG. 3 is a schematic block diagram illustrating an inner configuration of the home appliance of FIG. 1.

The home appliance 200 may include an input unit 220 for user input, a display unit 230 to display, e.g., an operational state of the home appliance 200, a communication unit 222 for communication with other external devices, a drive unit 245 to drive the home appliance 200, and a controller 270 for internal control.

In one example, when the home appliance is the refrigerator 200a, the drive unit 245 may include a refrigerating compartment drive unit to operate a refrigerating compartment fan for supply of cold air into a refrigerating compartment, a freezing compartment drive unit to operate a freezing compartment fan for supply of cold air into a freezing compartment, and a compressor drive unit to operate a compressor for compression of refrigerant.

In another example, when the home appliance is the washing machine 200b, the drive unit 245 may include a drive unit to operate a tub or a drum.

In another example, when the home appliance is the air conditioner 200c, the drive unit 245 may include a compressor drive unit to operate a compressor for an outdoor unit, an outdoor unit fan drive unit to operate an outdoor fan for heat exchange, and an indoor unit fan drive unit to operate an indoor fan for heat exchange.

In another example, when the home appliance is the cooking appliance 200d, the drive unit 245 may include a microwave drive unit to output microwaves into a cavity.

In another example, when the home appliance is the cleaner 200e, the drive unit 245 may include a fan motor drive unit for air suction.

The communication unit 222 may include a near field communication unit 217 that enables at least near field communication. Moreover, the home appliance 200 may further include a memory 240 for storage of data in the home appliance 200.

Meanwhile, for product registration of the home appliance 200, the communication unit 222 may receive data from the mobile terminal 600, or may perform data exchange with the access point device 400.

More specifically, the communication unit 222 may receive a MAC address of the access point device 400 from the mobile terminal 600, may receive identifier information, encoding method information, and authentication method information from the access point device 400, and may access the access point device 400 using the received identifier information, encoding method information, and authentication method information. Then, the communication unit 222 may transmit product information to the server 500 by way of the access point device 400.

The communication unit 222 may request, based on the MAC address information received from the mobile terminal 600, that the access point device 400 transmit the identifier information, encoding method information, and authentication method information.

The communication unit 222 may receive a beacon signal including the identifier information, encoding method information, and authentication method information from the access point device 400.

With regard to reception of the MAC address information, specifically, the communication unit 222 may scan a plurality of wireless channels and may receive a starting signal through any one channel among the wireless channels. Subsequent to reception of the starting signal, the communication unit 222 may receive a message including the MAC address information through the corresponding channel.

The controller 270 may access the access point device 400 based on the received MAC address information for product registration of the home appliance 200.

The controller 270 may receive password information in addition to the MAC address information. In this case, the controller 270 may access the access point device 400 using the MAC address information and the password information.

More specifically, when accessing the access point device 400, the controller 270 may control access to the access point device 400 using identifier information, encoding method information, authentication method information, and password information.

The controller 270 may control to request, based on the MAC address information received from the mobile terminal 600, that the access point device 400 transmit the identifier information, encoding method information, and authentication method information.

Once the identifier information, encoding method information, and authentication method information have been received from the access point device 400, the controller 270 may control access to the access point device 400 and then control transmission of product information to the server 500 by way of the access point device 400.

When the controller 270 receives a beacon signal, the controller 270 may extract identifier information, encoding method information, and authentication method information from the beacon signal. In addition, upon reception of the starting signal, the controller 270 may remove a fixed-length packet from a packet header of the starting signal and decode the packet header from which the fixed-length packet has been removed.

Figure 4:
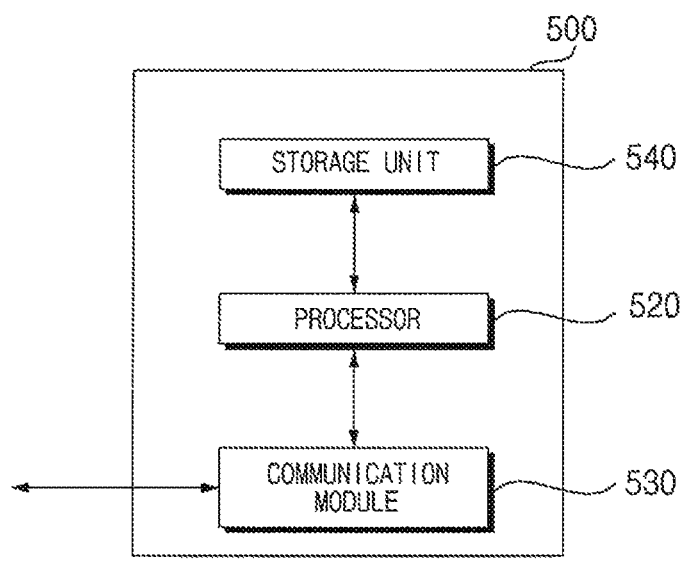
FIG. 4 is a block diagram showing an inner configuration of a server shown in FIG. 1.

FIG. 4 is a block diagram illustrating an inner configuration of the server of FIG. 1.

The server 500 may include a communication module 530, a storage unit 540, and a processor 520. The communication module 530 may receive home appliance related information from the mobile terminal 600. Particularly, the communication module 530 may receive product information of the home appliance.

Then, the communication module 530 may transmit product registration result information related to the received product information of the home appliance to the mobile terminal 600. To this end, the communication module 530 may include an Internet module or a mobile communication module. The storage unit 540 may store the received product information of the home appliance for product registration of the home appliance.

The processor 520 may control general operations of the server 500. In one example, when the processor 520 receives product information of the home appliance from the mobile terminal 600, the processor 520 may control generation of product registration result information of the home appliance. Then, the processor 520 may control transmission of the generated product registration result information to the mobile terminal 600.

In another example, when the home appliance related information is power consumption information related to the home appliance, the processor 520 may control transmission of power information, such as power price information, on-peak-time power information, off-peak-time power information, real-time power information, etc., stored in the storage unit 540 to the mobile terminal 600.

The server 500 may be a server managed by a manufacturer of the home appliance 200, a server managed by a manager of a store that sells applications related to the home appliance 200, or another appropriate type of server device.

Figure 5:
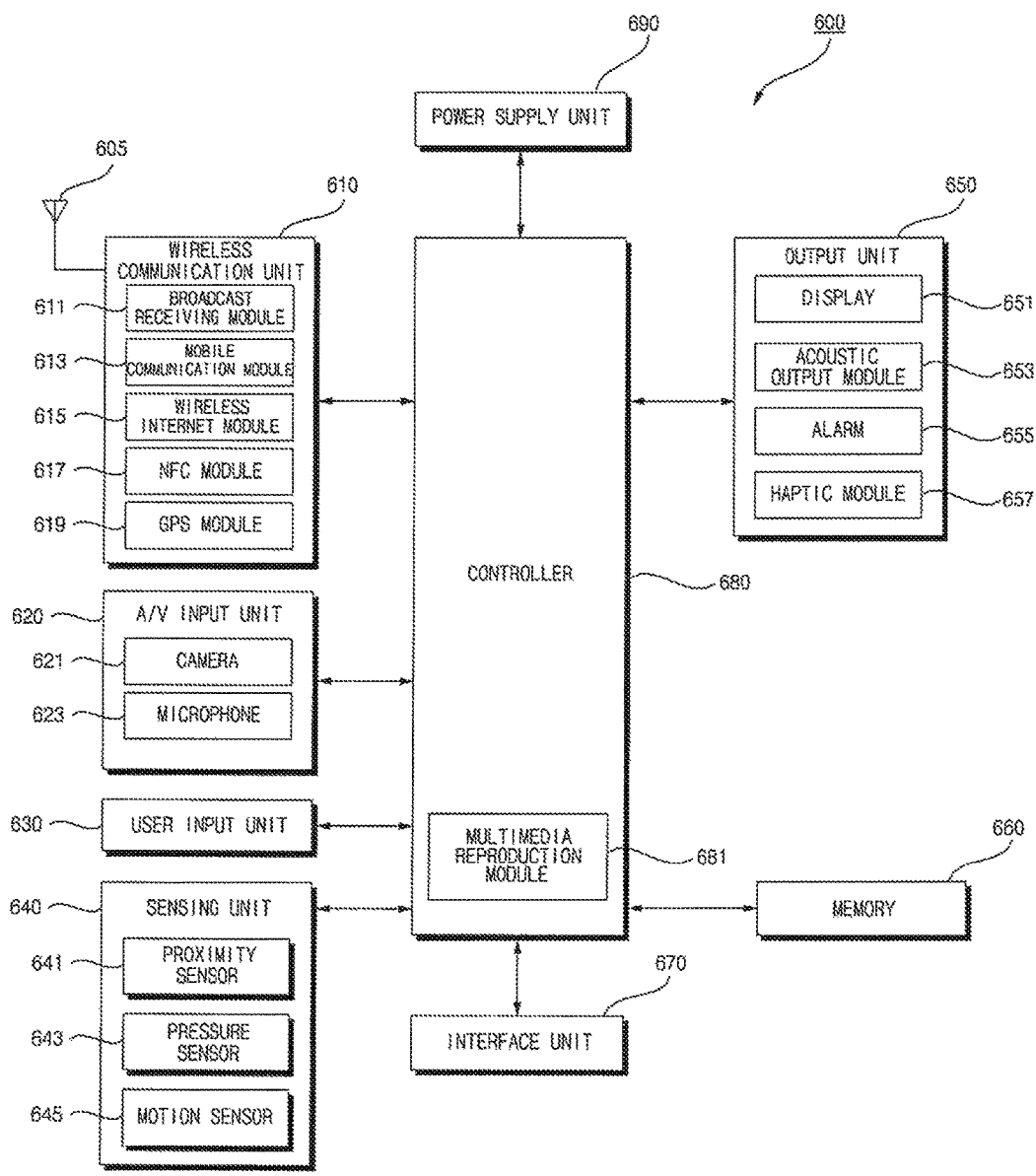
FIG. 5 is a block diagram showing an inner configuration of a mobile terminal shown in FIG. 1.

FIG. 5 is a block diagram illustrating an inner configuration of the mobile terminal of FIG. 1.

The mobile terminal 600 may include a wireless communication unit 610, an audio/video (A/V) input unit 620, a user input unit 630, a sensing unit 640, an output unit 650, a memory 660, an interface unit 670, a controller 680 and a power supply unit 690.

The wireless communication unit 610 according to one embodiment of the present disclosure may perform wireless data exchange with a power management unit 500 via a network sharer 550. In one example, when the mobile terminal 600 is in a power monitoring mode with respect to an internal power network, the wireless communication unit 610 may transmit a power monitoring request and, consequently, receive monitoring information. In another example, when the mobile terminal 600 is in a remote control mode with respect to an internal power network, the wireless communication unit 610 may transmit a remote control signal and, consequently, receive result information related to remote control.

The wireless communication unit 610 may include a broadcast receiving module 611, a mobile communication module 613, a wireless Internet module 615, a near field communication (NFC) module 617, and a global positioning system (GPS) module 619.

The broadcast receiving module 611 may receive at least one of broadcast signals and broadcast related information from an external broadcast management server through broadcast channels. In this case, examples of the broadcast channels may include satellite channels and terrestrial channels. The broadcast signals and/or broadcast related information received via the broadcast receiving module 611 may be stored in the memory 660.

The mobile communication module 613 may perform transmission and reception of radio signals with at least one of a base station, an external terminal, and a server on a mobile communication network. Here, the radio signals may include voice call signals, image call signals, or various types of data based on text/multimedia message transmission and reception.

The wireless Internet module 615 may be a module for wireless Internet connection. The wireless Internet module 615 may be internally or externally coupled to the mobile terminal 600. For example, the wireless Internet module 615 may perform Wi-Fi based wireless communication or Wi-Fi direct based wireless communication.

The NFC module 617 may perform near field communication (NFC). When the NFC module 617 approaches an electronic device equipped with an NFC tag or NFC module within a prescribed distance, e.g., performs tagging at the electronic device, the NFC module 617 may receive or transmit data from or to the corresponding electronic device.

Examples of other near field communication technologies may include Bluetooth, Radio Frequency IDentification (RFID), Infrared Data Association (IrDA), Ultra WideBand (UWB), and ZigBee.

The GPS module 619 may receive position information from a plurality of GPS satellites. Moreover, the A/V input unit 620 may serve to input audio signals or video signals, and may include a camera 621 and a microphone 623.

The user input unit 630 may serve to generate key input data that is input by the user to control operation of the mobile terminal 600. To this end, the user input unit 630 may include a key pad, a dome switch, and a touch pad (static pressure/electrostatic). In particular, when the touch pad is layered onto a display 651, this may be referred to as a touchscreen.

The sensing unit 640 may sense a current state of the mobile terminal 600, such as an opening/closing state of the mobile terminal 600, a position of the mobile terminal 600, the presence of user touch, etc., and generate sensing signals to control operation of the mobile terminal 600.

The sensing unit 640 may include a proximity sensor 641, a pressure sensor 643, and a motion sensor 645. The motion sensor 645 may sense, for example, motion or position of the mobile terminal 600 using an accelerometer, a gyro sensor, a gravity sensor, and the like. In particular, the gyro sensor serves to measure an angular velocity and may sense an orientation (angle) deviated from a reference direction.

The output unit 650 may include the display 651, an acoustic output module 653, an alarm 655, and a haptic module 657. The display 651 may serve to display and output information processed in the mobile terminal 600.

As described above, in the case in which the display 651 and the touch pad are layered one above another to construct a touchscreen, the display 651 may be used not only an output device, but also as an input device to enable input of information via user touch.

The acoustic output module 653 may serve to output audio data stored in the memory 660 or received from the wireless communication unit 610. The acoustic output module 653 may include a speaker and a buzzer, for example.

The alarm 655 may serve to output a signal to notify occurrence of an event of the mobile terminal 600. For example, the alarm 655 may output a vibration signal.

The haptic module 657 may serve to generate various tactile effects that the user can perceive. A representative example of tactile effects generated by the haptic module 657 is vibration.

The memory 660 may store programs for processing and control of the controller 680. The memory 660 may function to temporarily store input or output data (e.g., a phonebook, messages, still images and moving images).

The interface unit 670 may serve as an interface with respect to all external appliances connected to the mobile terminal 600. The interface unit 670 may receive data from these external appliances or receive power, and transmit the same to respective inner components of the mobile terminal 600. The interface unit 670 may also perform transmission of internal data of the mobile terminal 600 to the external appliances.

The controller 680 may typically control operation of the aforementioned units to control general operation of the mobile terminal 600. For example, the controller 680 may perform control and processing related to voice calls, data communication, image calls, and the like. In addition, the controller 680 may include a multimedia reproduction module 681 for multimedia reproduction. The multimedia reproduction module 681 may be hardware in the controller 680, or may be software separate from the controller 680.

The power supply unit 690 may supply power required to operate the respective components upon reception of external power and internal power under control of the controller 680.

Meanwhile, for product registration of the home appliance 200, the wireless communication unit 610 may perform data exchange with the server 500, or transmit data to the home appliance 200.

Particularly, the wireless communication unit 610 may transmit MAC address information to the home appliance 200. Upon transmission of the MAC address information, in addition, the wireless communication unit 610 may further transmit password information of the access point device 400.

Upon such transmission of the MAC address information, the wireless communication unit 610 may transmit a starting signal for a prescribed duration of time and, after transmission of the starting signal, transmit a message including the MAC address information using any one wireless channel among a plurality of wireless channels.

The wireless communication unit 610 may transmit a starting signal including a packet header to which a fixed-length packet is added. In this case, upon transmission of the MAC address information, the wireless communication unit 610 may transmit a plurality of packets including the encoded MAC address information, the packets having different lengths.

For product registration of the home appliance 200, the controller 680 may control display of a screen including an application related to the home appliance 200 in response to an execution input of the application related to the home appliance 200. When a login item on the application screen is selected, but product registration of the home appliance 200 is not completed, the controller 680 may control setting of information related to any one access point device 400 among a plurality of access point devices 400 stored in the mobile terminal 600 to the access point device 400 with respect to the home appliance 200 and, based on this setting, control the wireless communication unit 610 to transmit a MAC address of the corresponding access point device 400 to the home appliance 200. Then, the controller 680 may control reception of a message indicating completion of product registration with respect to the home appliance 200 from the server 500, and control display of the product registration completion message.

More specifically, when product registration is not completed in a selected state of a login item, the controller 680 may control display of a product registration guide screen and, subsequent to display of the guide screen, control display of information related to any one access point device 400 among a plurality of access point devices 400 stored in the mobile terminal 600.

In addition, upon transmission of a starting signal, the controller 680 may add a fixed-length packet to a packet header that is variable based on encoding.

After display of the guide screen, the controller 680 may control display of a home screen in response to an input to exit from the currently executed application. The controller 680 may control display of a setting screen when a setting item on the home screen is selected, and control display of a screen for selection of the access point device 400 in response to an input for setting the access point device 400 on the setting screen.

Then, the controller 680 may control setting of the selected access point device 400 to an access point device 400 that will access the home appliance 200 when the specific access point device 400 on the screen for selection of the access point device 400 is selected. After this setting, the controller 680 may execute an application related to the home appliance 200 in response to an input for execution of the application related to the home appliance 200 on the home screen.

The block diagram of the mobile terminal 600 of FIG. 5 is based on one embodiment of the present disclosure. The components of the block diagram may be integrated, added or omitted according to the specifications of the mobile terminal 600 which is actually implemented. For example, two or more components may be combined into a single component or a single component may be divided into two or more components as needed. In addition, functions of the components are set forth herein merely to facilitate explanation of embodiments of the present disclosure and the specific operations and configurations of the components should not be construed as limiting the scope of the present disclosure.

Figure 6A:
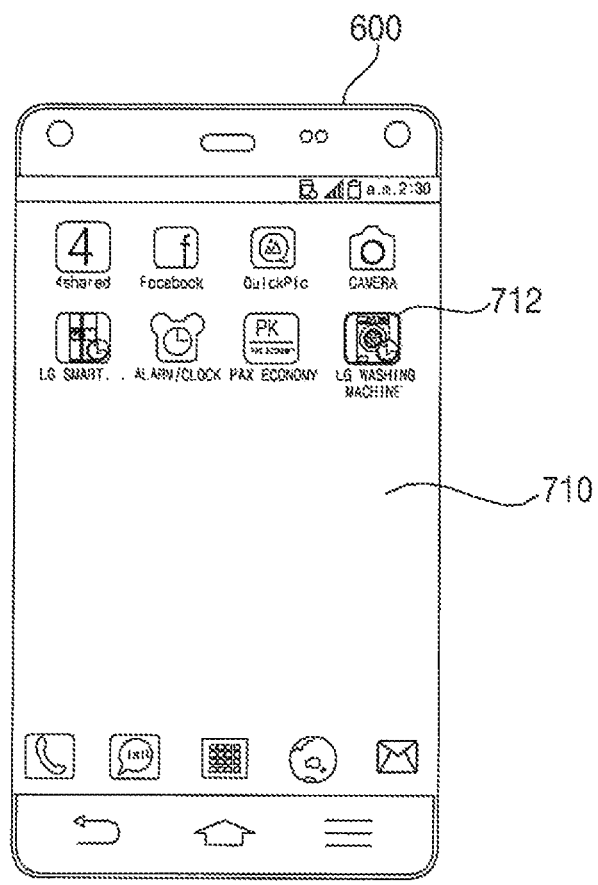
FIGS. 6A to 6X are views showing one example of a product registration method of a home appliance.
Figure 6B:
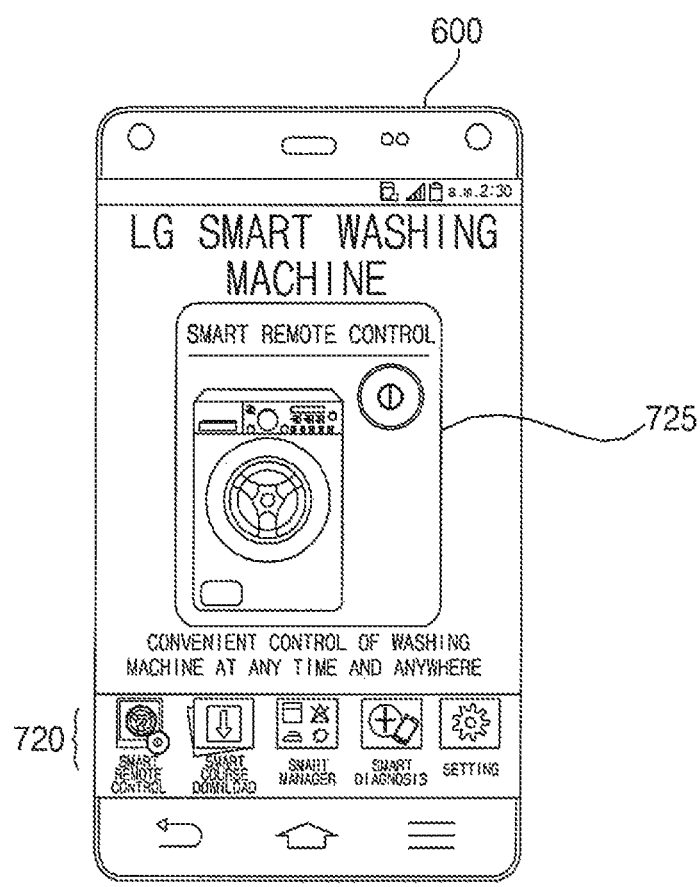
Figure 6C:
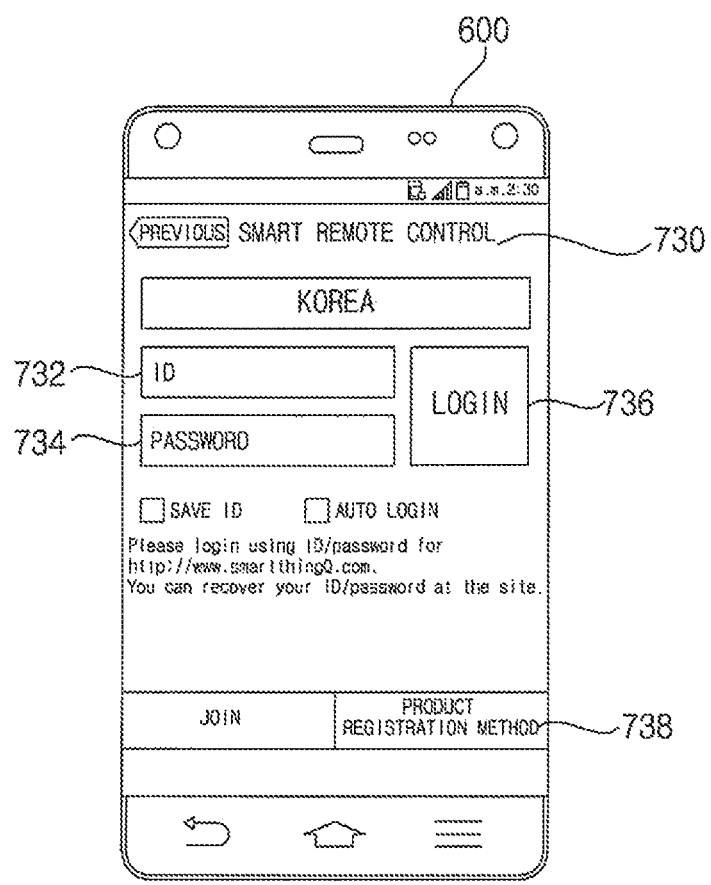
Figure 6D:
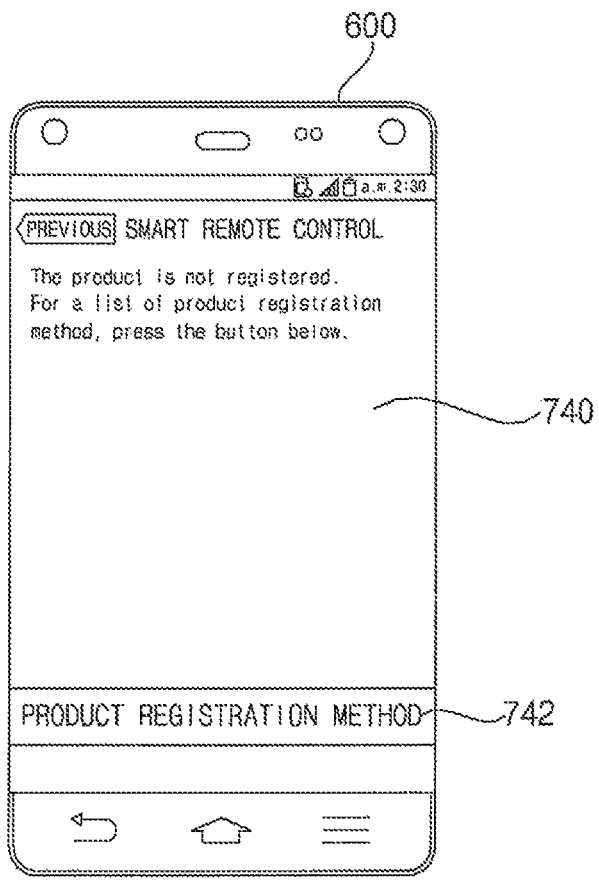
Figure 6E:
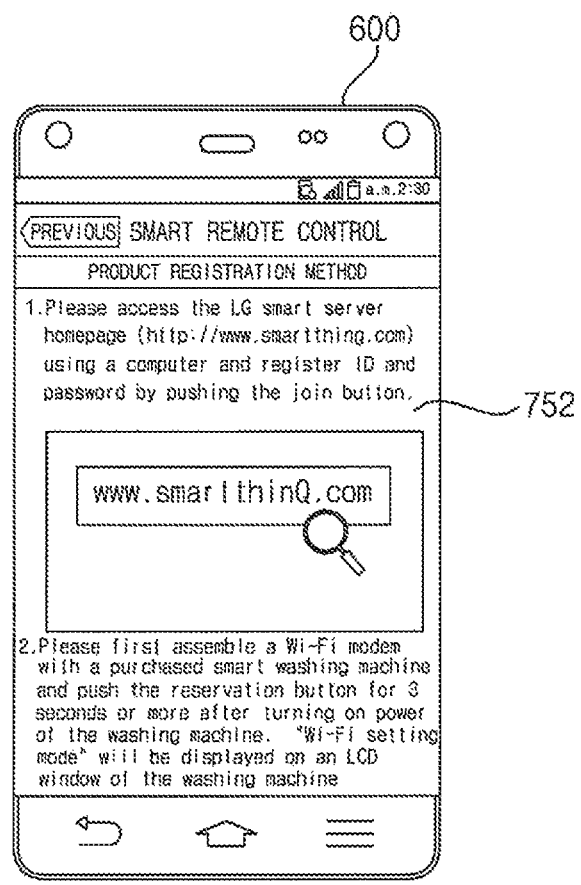
Figure 6F:
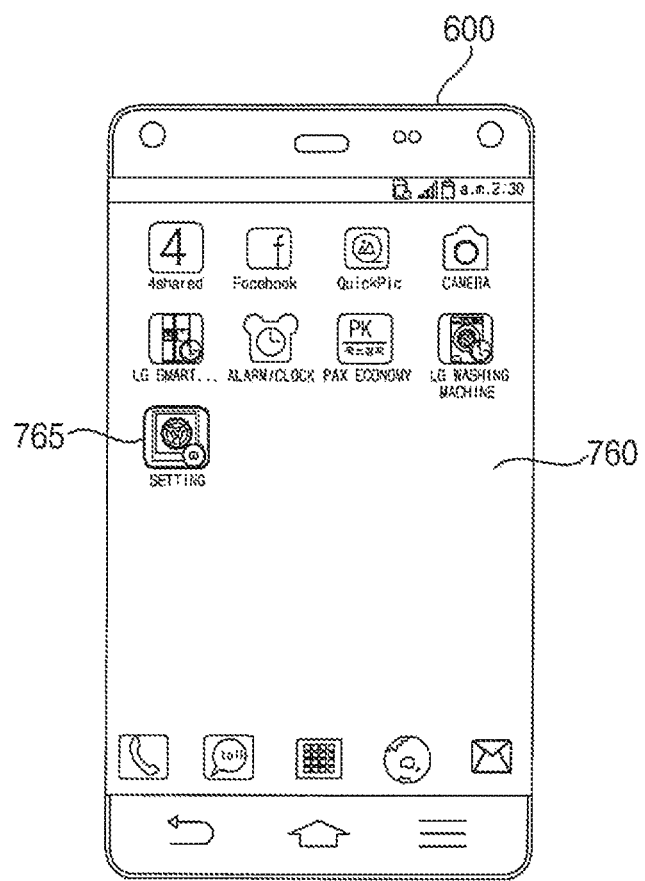
Figure 6G:
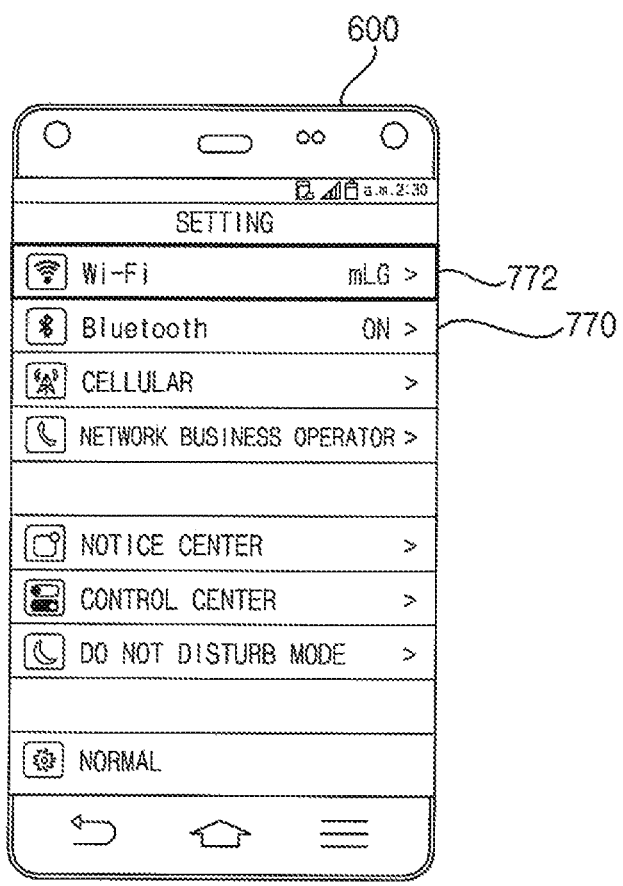
Figure 6H:
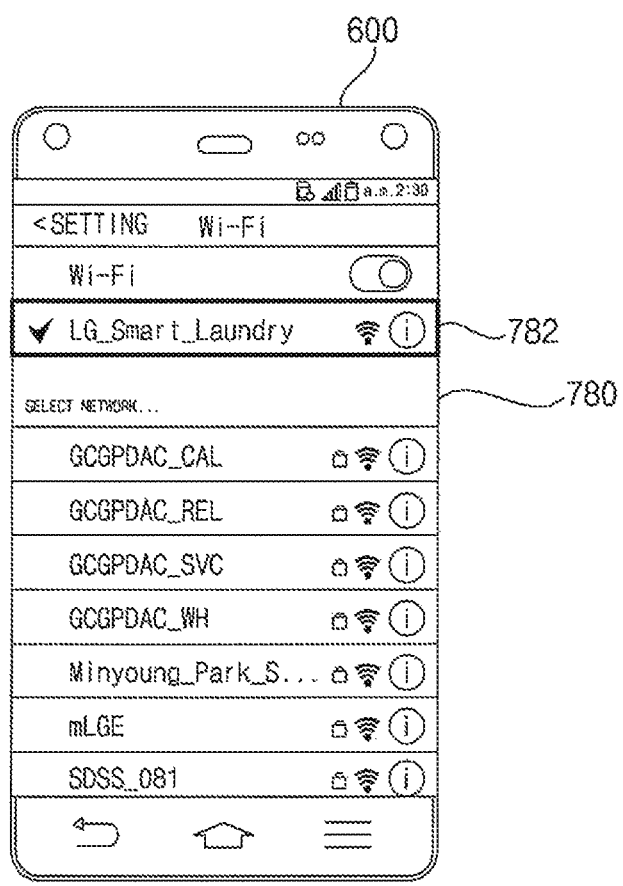
Figure 6I:
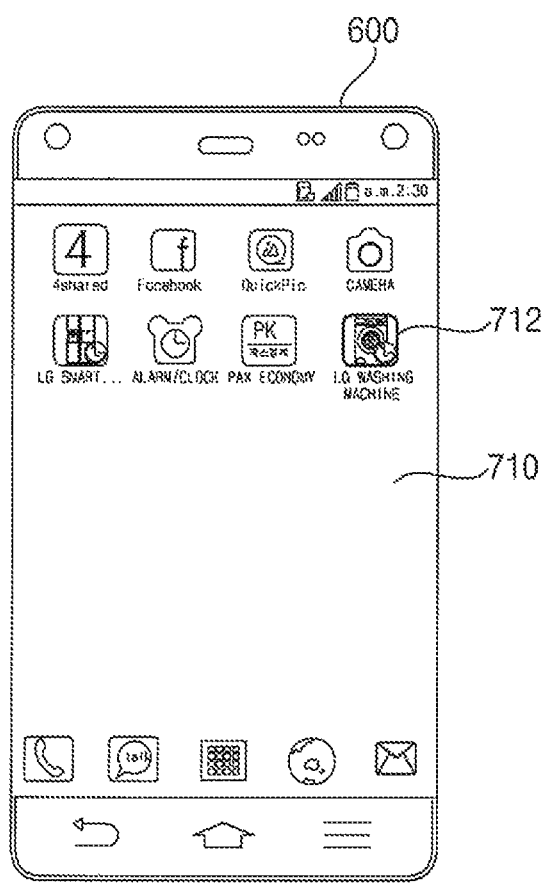
Figure 6J:
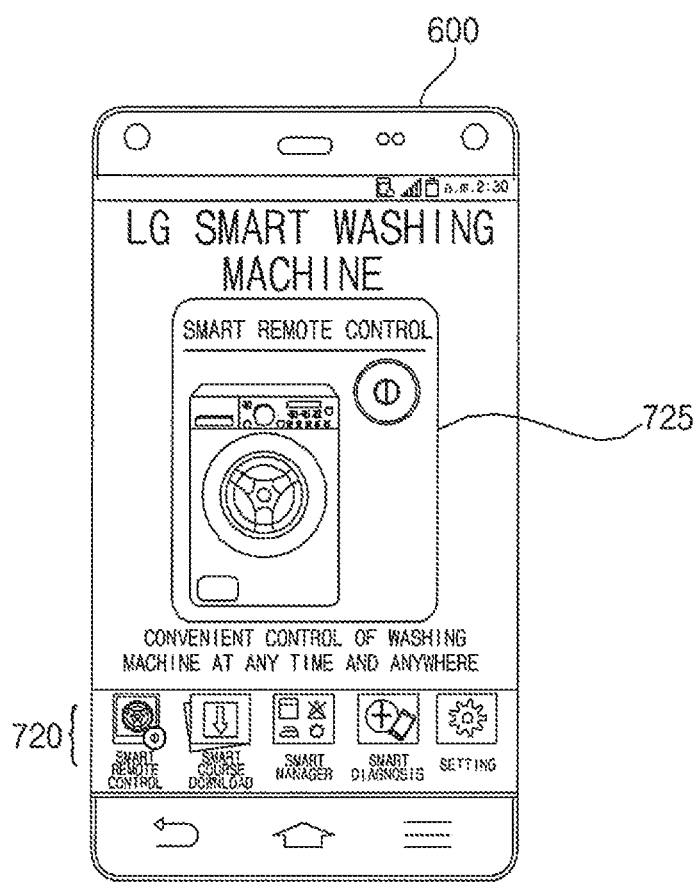
Figure 6K:
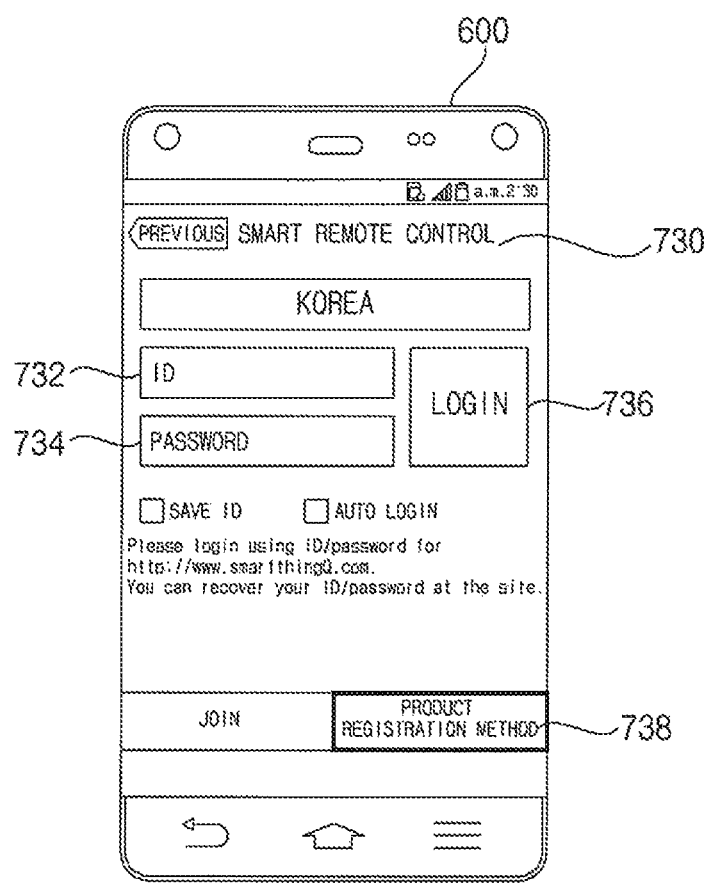
Figure 6L:
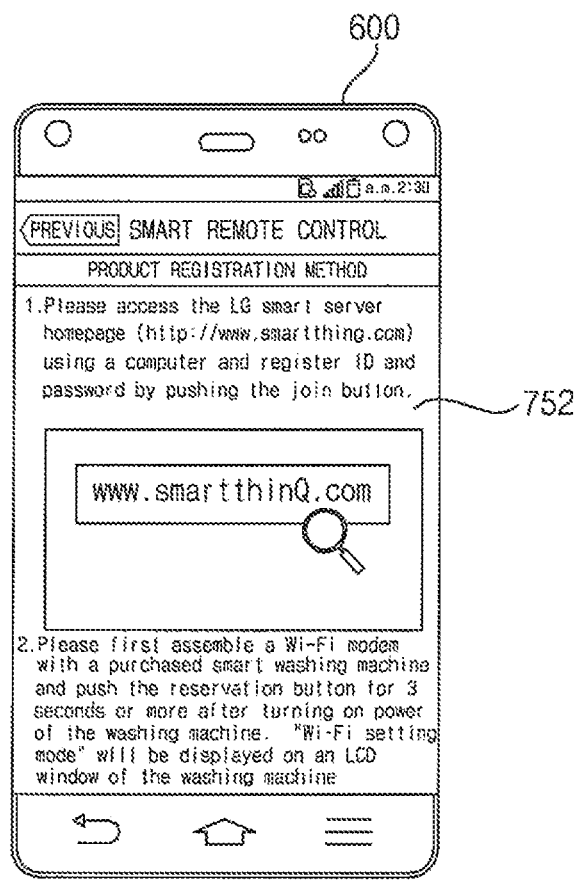
Figure 6M:
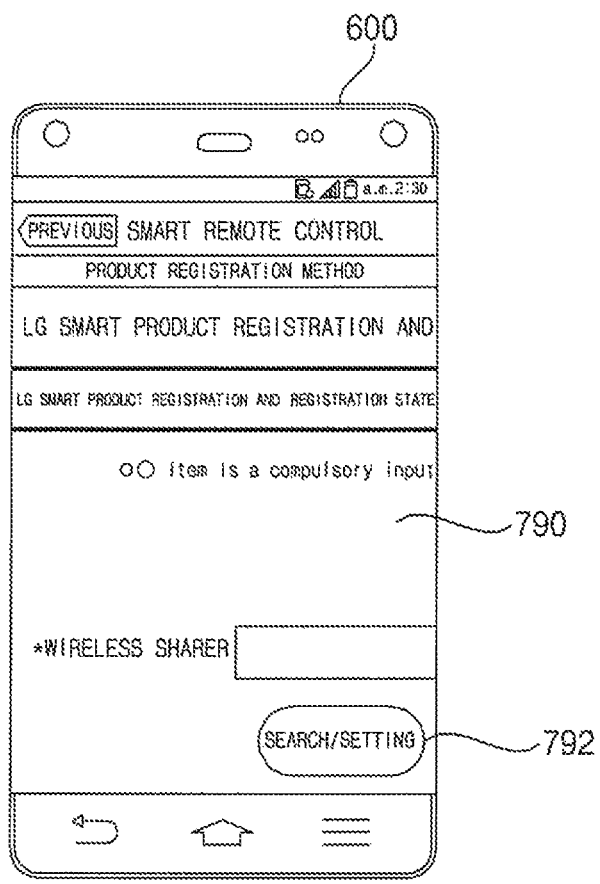
Figure 6O:
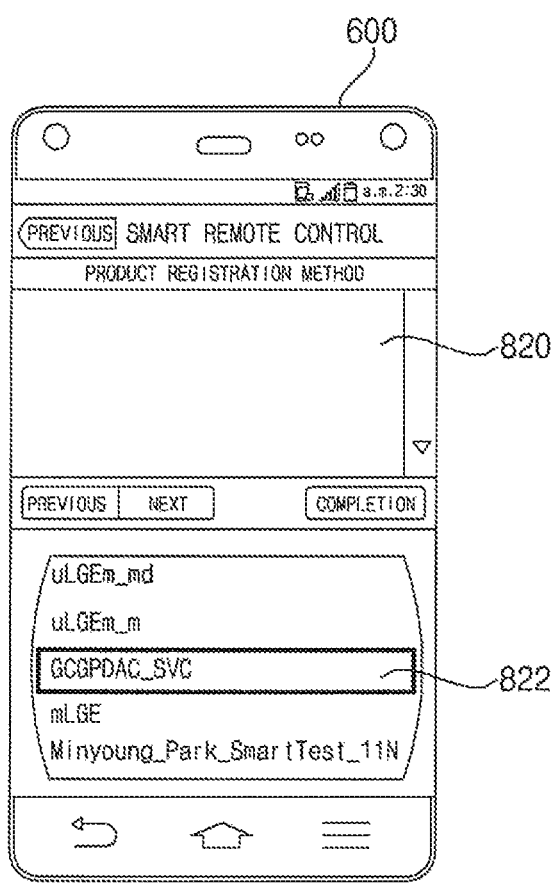
Figure 6P:
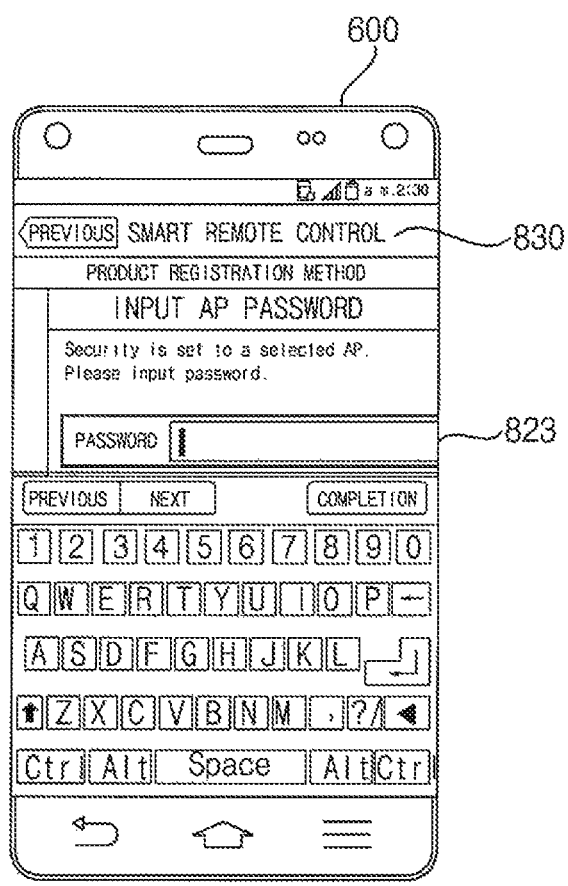
Figure 6Q:
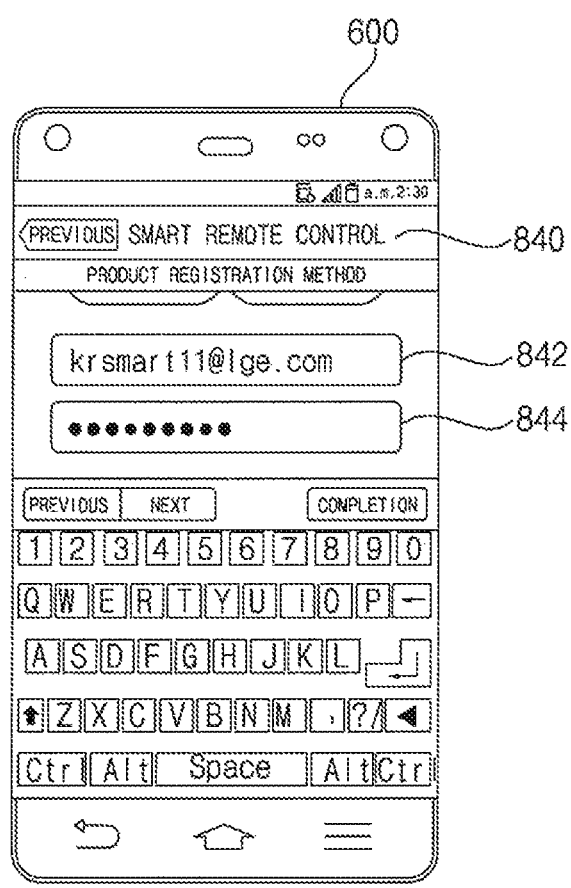
Figure 6R:
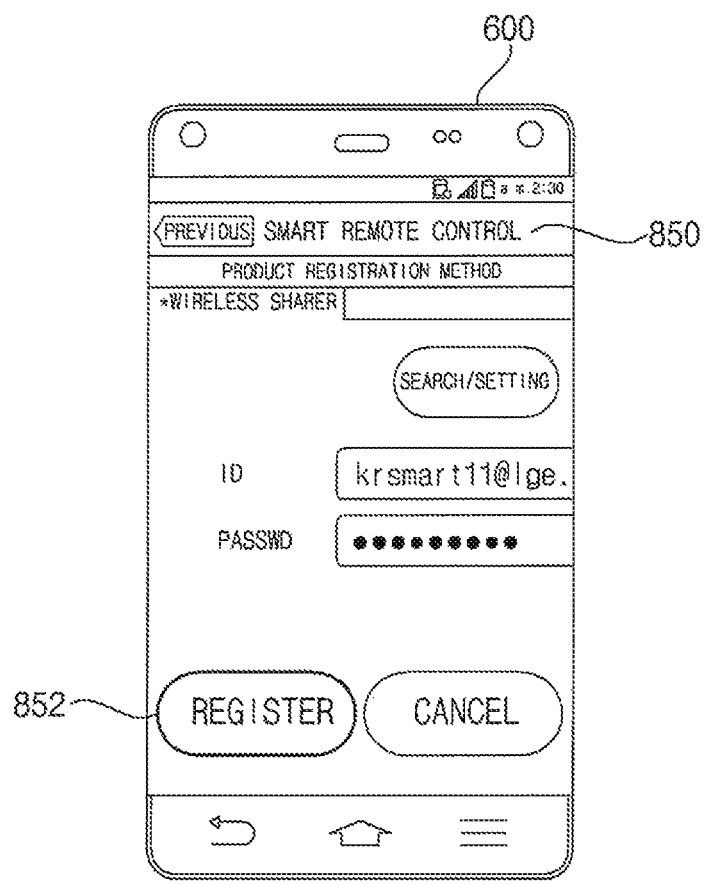
Figure 6S:
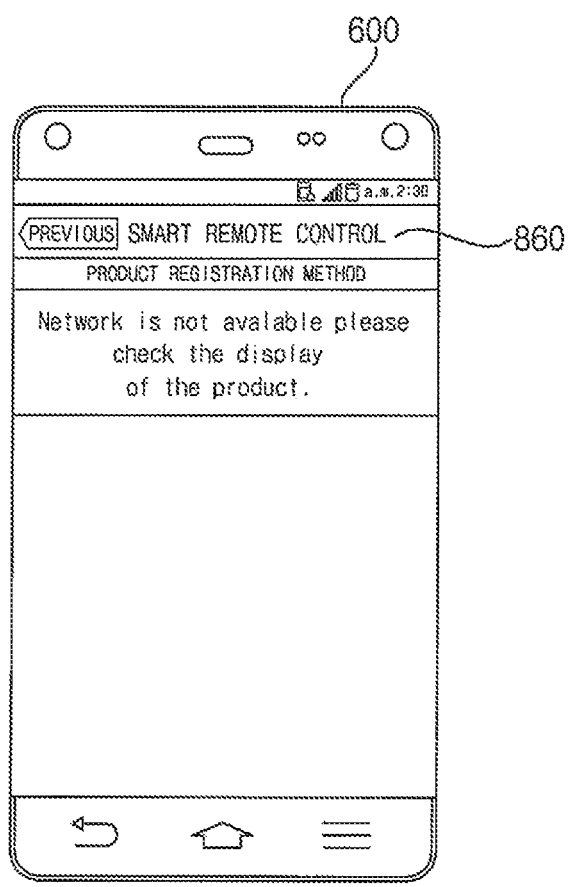
Figure 6T:
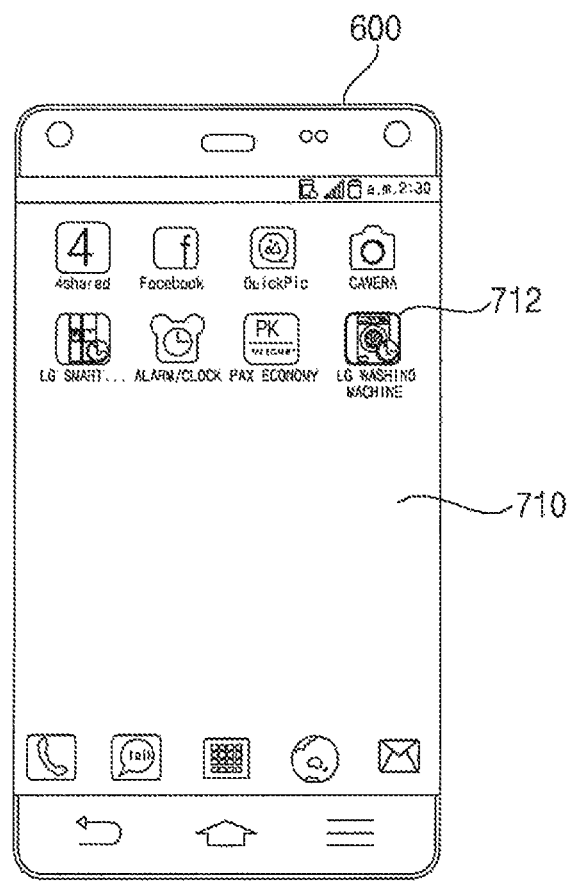
Figure 6U:
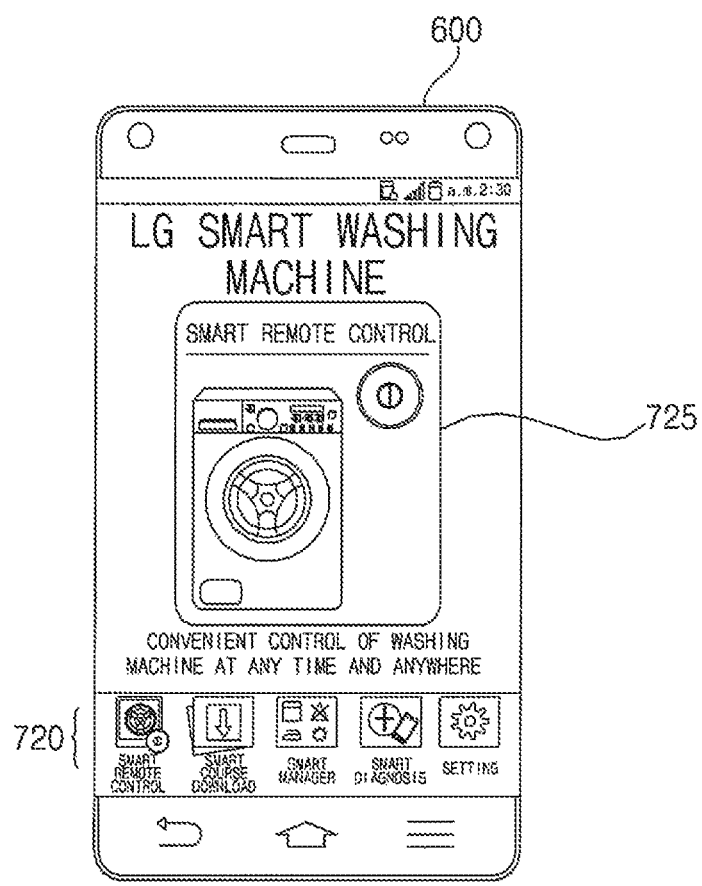
Figure 6V:
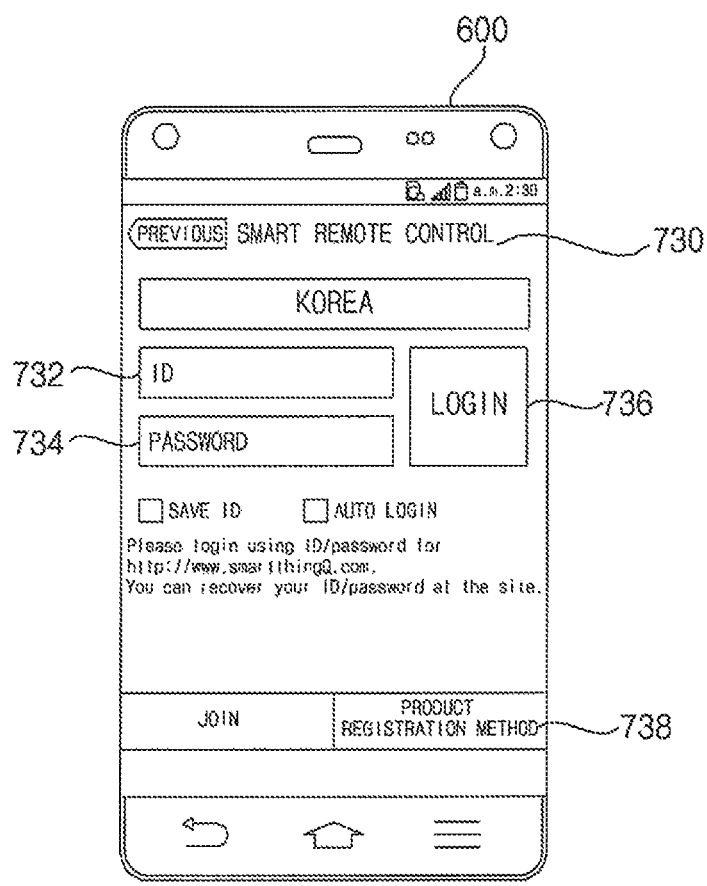
Figure 6W:
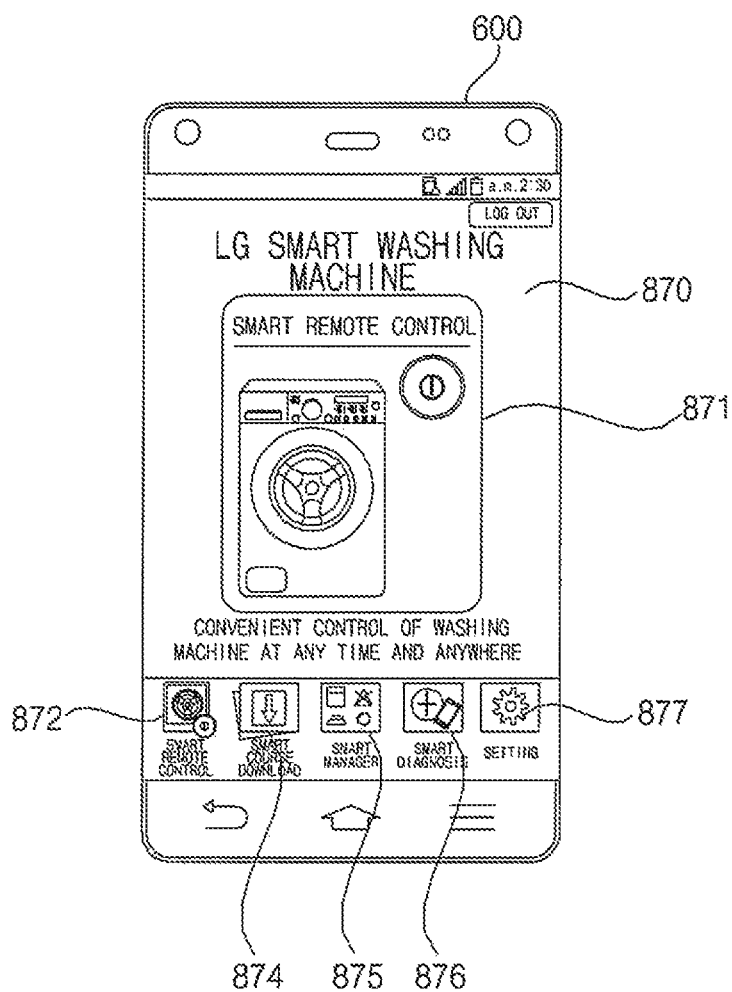
Figure 6X:
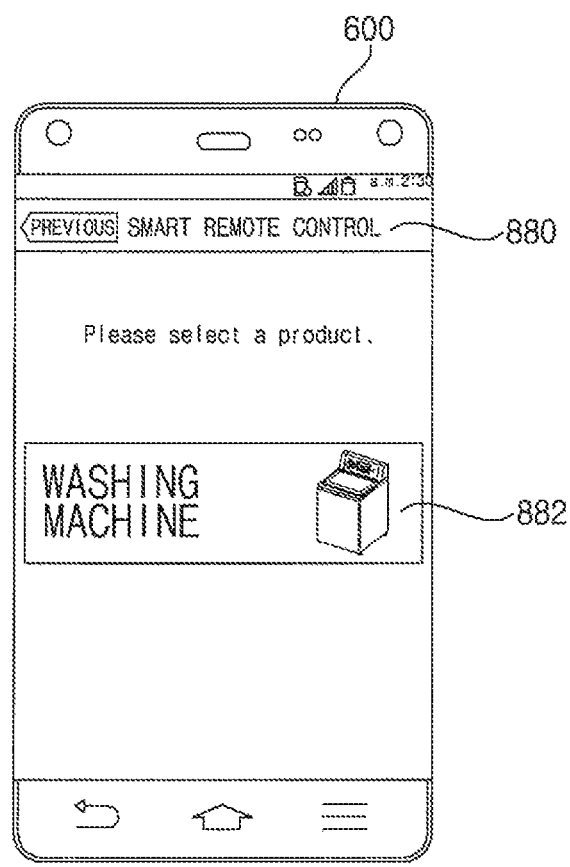

FIGS. 6A to 6X are views illustrating one example of one product registration method of a home appliance.

Upon selection of an application item 712 related to the home appliance on a home screen 710 of the mobile terminal 600 as illustrated in FIG. 6A, a home appliance application screen may be displayed as illustrated in FIG. 6B. Then, upon selection of any one item 725 on the home appliance application screen, a login screen 730 including a login item 736, an ID input window 732, a password input window 734, and the like may be displayed as illustrated in FIG. 6C.

When product registration is not completed when the user inputs their ID and password and selects the login item 736 on the login screen 730, a product registration guide screen 740 may be displayed as illustrated in FIG. 6D. Alternatively, the product registration guide screen 740 shown in FIG. 6D may be displayed upon selection of a product registration guide item 738 on the login screen 730.

Upon selection of a product registration item 742 on the product registration guide screen 740, detailed product registration guide information 752 may be displayed as illustrated in 6E.

In this case, the product registration guide information 752 may include setting information related to an access point device for product registration.

For setting of the access point device, it is necessary to execute a settings application in addition to the application related to the home appliance. For example, manual network configuration may be necessary in a settings application outside the home appliance application.

Accordingly, a home screen 760 may be displayed as illustrated in FIG. 6F in response to a user input to exit from the application related to the home appliance. Upon selection of a settings application item 765 on the home screen 760, a settings application screen 770 may be displayed as illustrated in FIG. 6G as a setting application is executed.

In this case, upon selection of a setting item 772 related to an access point device on the setting application screen 770, e.g., upon selection of a "Wi-Fi" item as shown in the drawing, a list screen 780 including a list of access point devices may be displayed as illustrated in FIG. 6H. The mobile terminal 600 may be set to access a corresponding access point device upon selection of any one item 782 of the list.

Particularly, in an AP mode in which a specific key of the home appliance 200 is pushed to cause the home appliance 200 to operate as an access point device, it is desirable to select an item corresponding to the home appliance 200, e.g., "LG_Smart_Laundry" item 782. In this way, the mobile terminal 200 may access the home appliance 200.

In response to a user input to exit from the application related to the home appliance, the home screen 710 may again be displayed as illustrated in FIG. 6I. Then, upon selection of the application item 712 related to the home appliance on the home screen 710, the home appliance application screen may again be displayed as illustrated in FIG. 6J. Thereafter, upon selection of any one item 725 on the home appliance application screen, the login screen 730 including the login item 736, the ID input window 732, the password input window 734, and the like may again be displayed as illustrated in FIG. 6K.

Then, upon selection of the product registration guide item 738 on the login screen 730, the product registration guide screen 740 may be displayed as illustrated in FIG. 6L.

On the other hand, upon selection of the login item 736 on the login screen 730 of FIG. 6K, or subsequent to the product registration guide screen 740 of FIG. 6L, an access point device search screen 790 for product registration may be displayed as illustrated in FIG. 6M. Then, upon selection of a search item 792 on the access point device search screen 790, an access point device selection guide screen 810 including an access point device selection guide item 812 may be displayed as illustrated in FIG. 6N and, in turn, upon selection of the access point device selection guide item 812, a screen 820 including an access point device list 822 may be displayed as illustrated in FIG. 6O.

Then, upon selection of any one access point device of the list 822 on the screen 820, an input screen 830 including a password input window 823 with respect to an access point device may be displayed as illustrated in FIG. 6P. After input of a password, an input screen 840 including an ID input window 842 for input of a user ID and a password input window 844 for input of a user password may be displayed as illustrated in FIG. 6Q.

After input of the user ID and password, a product network blocking information screen 860 may be displayed as illustrated in FIG. 6S upon selection of a registration item 852 as illustrated in FIG. 6R. In other words, the home appliance may be switched from the AP mode in which the home appliance operates as an access point device to a station mode in which the home appliance is accessible to an external access point device.

For a time duration for which the home appliance 200 operates in the AP mode to cause the mobile terminal 600 to access the home appliance 200, the mobile terminal 600 may request that the home appliance 200 transmit product information, and the home appliance 200 may transmit product information to the mobile terminal 600.

Referring to FIGS. 6O and 6P, the mobile terminal 600 may transmit network information related to an access point device (e.g., service set identifier (SSID) and password information) to the home appliance 200 and, consequently, the home appliance 200 may be switched from the AP mode to the station mode. Then, the home appliance 200 may access a corresponding access point device GCFP-DAC_SVC using the network information related to the access point device (e.g., SSID and password information) as illustrated in FIGS. 6O and 6P.

Referring to FIG. 6R, the mobile terminal 600 may transmit product information received from the home appliance 200 to the server 500 upon selection of the registration item 852.

Then, in response to an input for display of the home screen in a state in which the product network blocking information screen 860 is displayed as exemplarily shown in FIG. 6S, the home screen 710 may again be displayed as illustrated in FIG. 6T. Upon selection of the application item 712 related to the home appliance on the home screen 710, the home appliance application screen may again be displayed as illustrated in FIG. 6U and, in turn, upon selection of any one item 725 on the home appliance application screen, the login screen 730 including the login item 736, the ID input window 732, the password input window 734, and the like may again be displayed as illustrated in FIG. 6V.

After input of an ID and password, a remote control screen 870 may be displayed as illustrated in FIG. 6W upon selection of the login item 736 on the login screen 730 and, in turn, upon selection of a washing machine remote control item 871, a screen 880 including an item 882 related to a completely registered product, e.g., a washing machine, may be displayed as illustrated in FIG. 6X.

The registration method as described above may have various disadvantages. For example, with this product registration scenario as illustrated in FIGS. 6A to 6X, the home appliance 200 may need to operate in an AP mode and subsequently in a station mode.

In addition, the mobile terminal 600 may need to sequentially execute a home appliance related application and a setting application so as to access the home appliance in an AP mode, and to again execute the home appliance related application. Consequently, the mobile terminal 600 may have to perform approximately 19 steps as illustrated in FIGS. 6A to 6S.

Hereinafter, a simplified product registration method to solve this procedural complexity will be described. Particularly, in a method according to one embodiment as disclosed hereinafter, it is unnecessary to set the home appliance to an AP mode. This method may cause the home appliance to operate in a monitoring mode and in a station mode in sequence.

Figure 7:
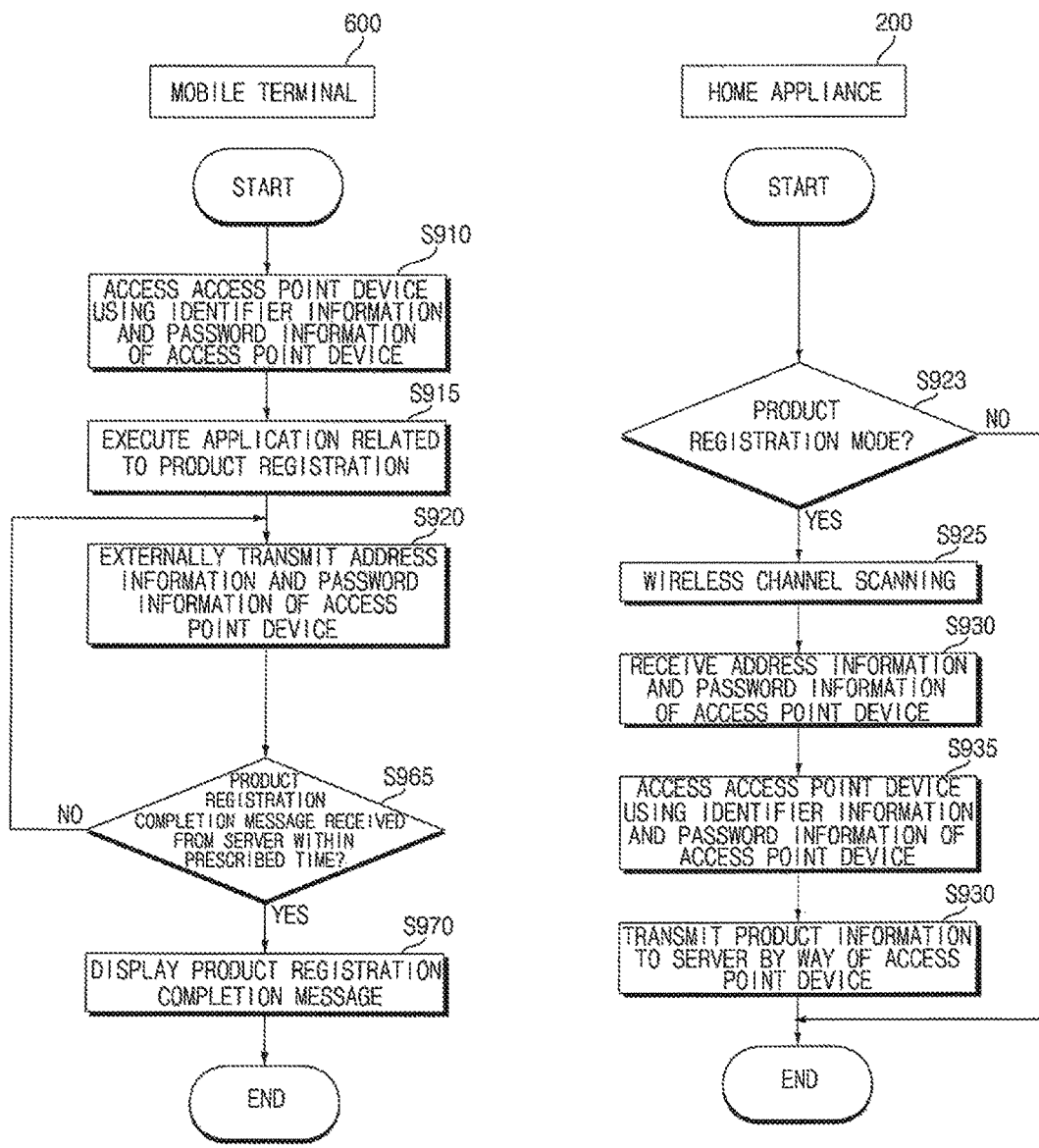
FIG. 7 is a flowchart showing another example of a method of operating the mobile terminal and the home appliance shown in FIG. 1.
Figure 8:
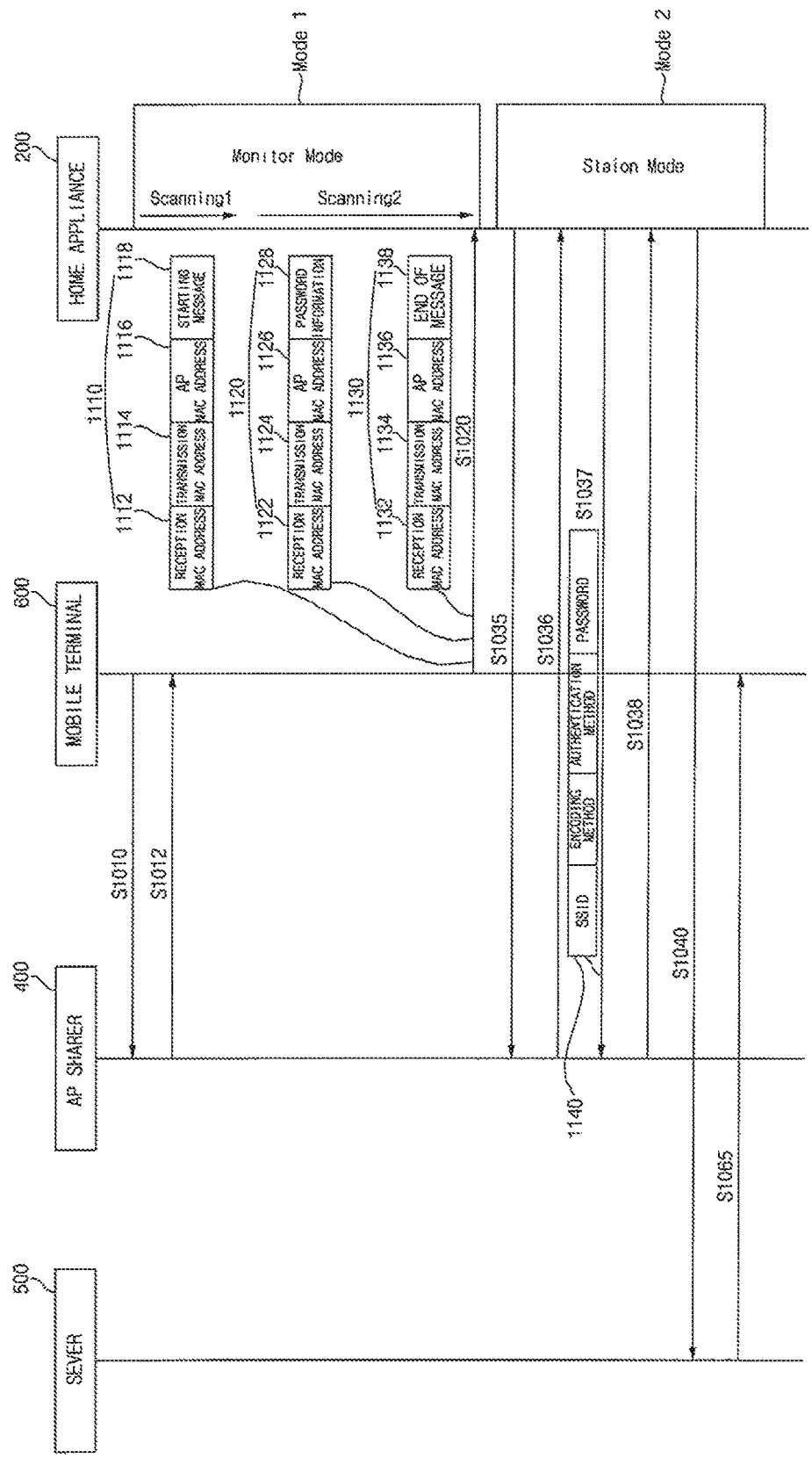
FIGS. 8 to 11 are reference views that illustrate the method of FIG. 7.
Figure 10:
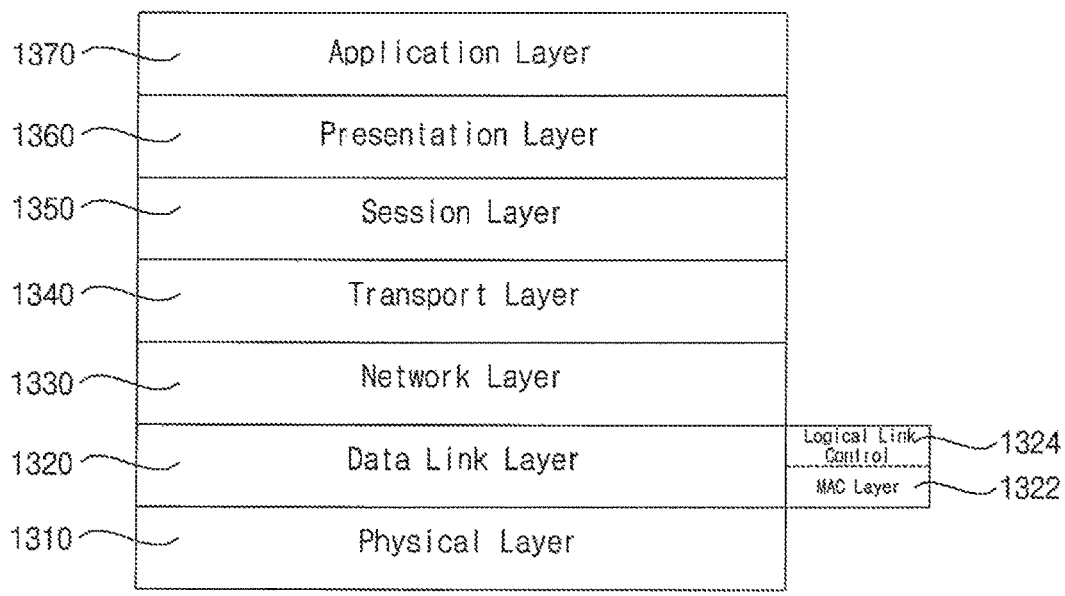
Figure 11:
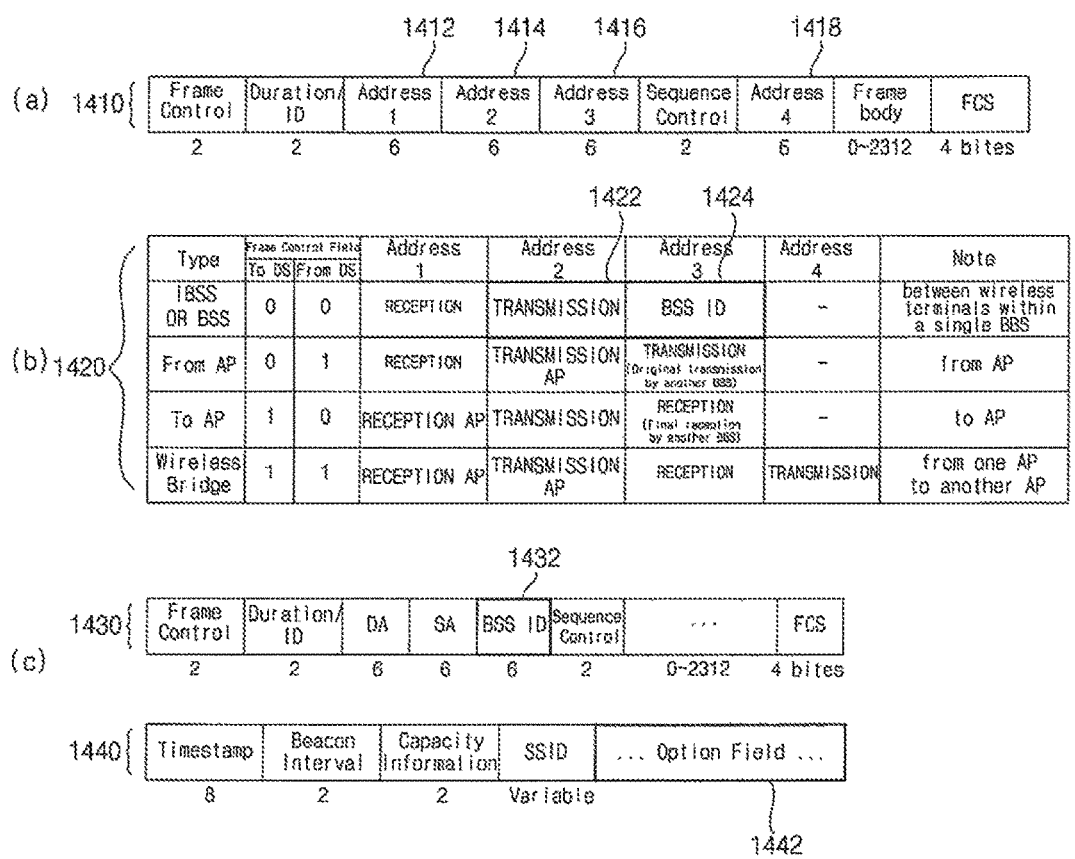

FIG. 7 is a flowchart illustrating another example of a method of operating the mobile terminal and the home appliance of FIG. 1. FIG. 8 is a flow diagram of communication between the home appliance, mobile terminal, AP device and servers according to the method of FIG. 7. FIGS. 9A to 9J are screen images of the mobile device to illustrate the method of FIG. 7. FIGS. 10 and 11 are diagrams to further illustrate the method of FIG. 7.

First, referring to FIG. 7, the mobile terminal 600 may access a proximate access point (AP) device using identifier information and password information during display of a settings screen, in step S910.

The mobile terminal 600 may execute an application related to the home appliance in response to an input for execution of the application related to the home appliance, in step S915. Then, the mobile terminal 600 may display an application execution screen.

Figure 9A:
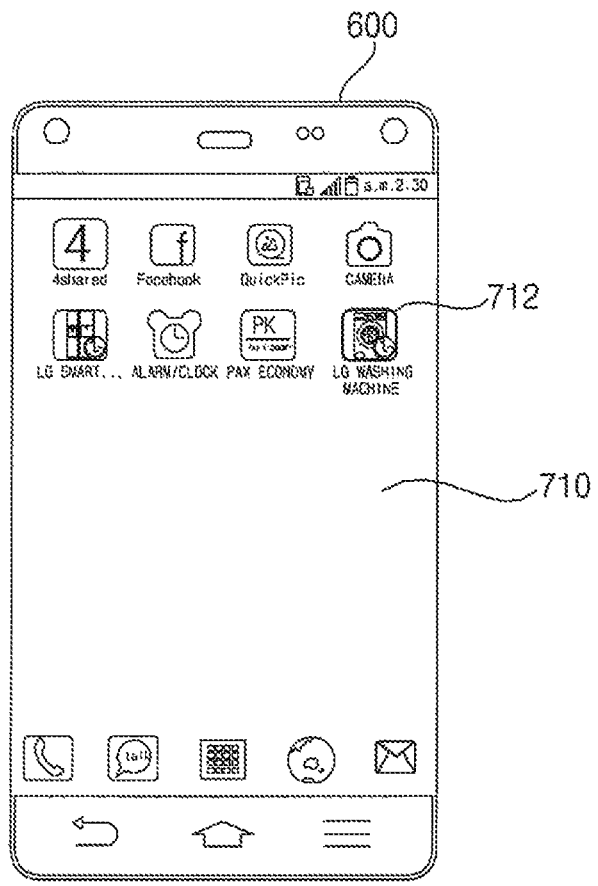

FIG. 9A illustrates a home screen 710 from which selection of the application item 712 related to the home appliance may be made. Thereby, the mobile terminal 600 may display a home appliance application execution screen as exemplarily shown in FIG. 9B.

Figure 9B:
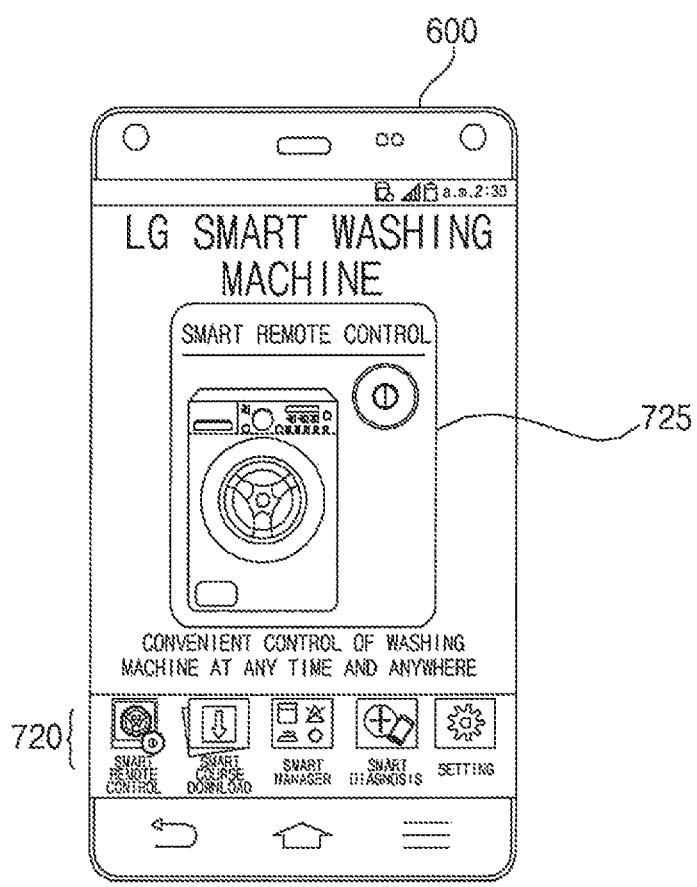

The application execution screen may include the remote control item 725 and a menu 720 that includes various items. As illustrated in FIG. 9B, the menu 720 may include a smart remote control item, a smart course download item, a smart manager item, a smart diagnosis item, and a setting item.

Figure 9C:
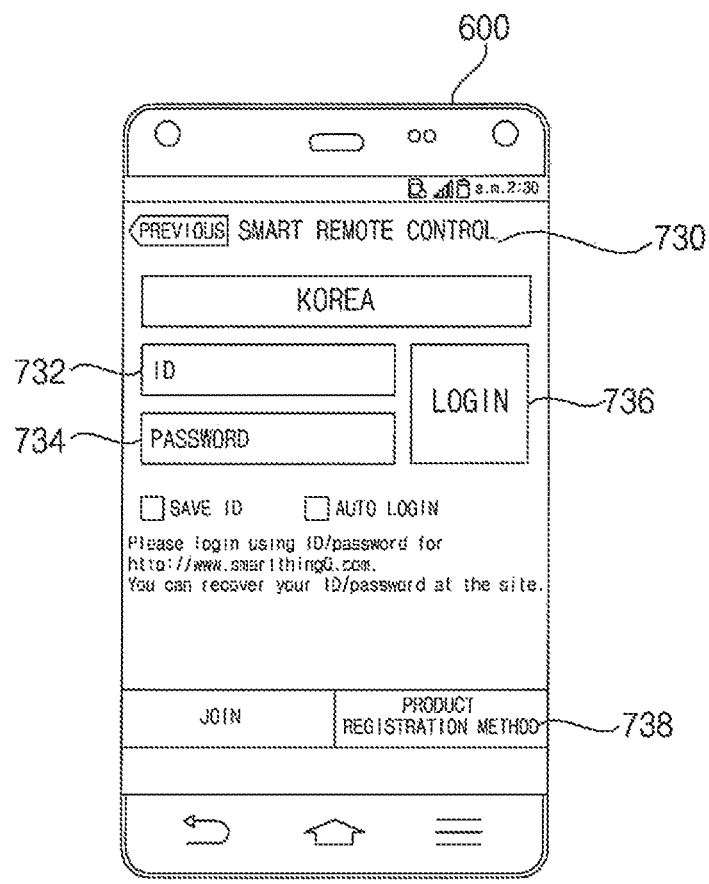

Upon selection of the remote control item 725 on the application execution screen, the login screen 730 may be displayed as illustrated in FIG. 9C. The login screen 730 may include the ID input window 732, the password input window 734, the login item 736, and the product registration guide item 738.

Figure 9D:
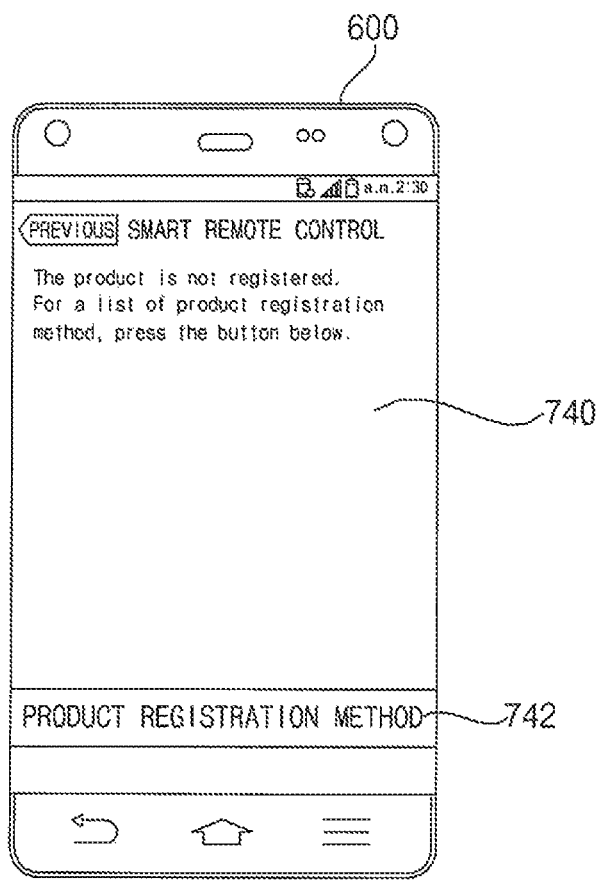

When product registration is not completed when the login item 736 is selected, the mobile terminal 600 may display the product registration guide screen 740 as illustrated in FIG. 9D. Upon selection of the product registration item 742 on the product registration guide screen 740, the mobile terminal 600 may display information related to any one access point device among a plurality of access point devices stored therein as illustrated in FIG. 9E.

Figure 9E:
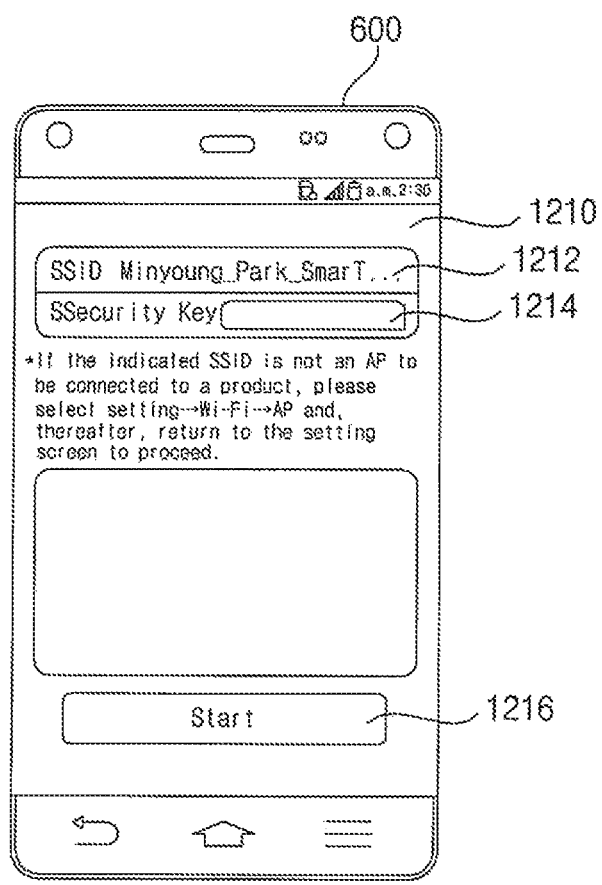

FIG. 9E shows an information screen 1210 related to an access point device that the mobile terminal 600 currently accesses.

The information screen 1210 related to the access point device may include identifier information (e.g., SSID) 1212 related to the currently accessed access point device and a password information input window 1214 related to the access point device.

When the mobile terminal 600 stores password information related to the currently accessed access point device, the password information may be displayed in a default format in the password information input window 1214. For example, "*****" may be displayed to hide the entered password or the password may be displayed.

The information screen 1210 related to the access point device may further include an access point device setting item 1216. Upon selection of the access point device setting item 1216, the mobile terminal 600 may externally transmit a MAC address of the access point device, in step S920.

The mobile terminal 600 may transmit password information along with the MAC address information related to the access point device.

More specifically, the mobile terminal 600 may transmit MAC address information of the access point device to the home appliance using a MAC frame address field.

The password information may be transmitted in a single direction manner using a UDP packet length.

Subsequent to step S920, a product registration mode may begin as a prescribed key of the home appliance 200 is pushed. The controller 270 of the home appliance 200 may determine whether the product registration mode begins as the prescribed key is pushed, in step S923, and may control scanning of wireless channels upon determination of the product registration mode, in step S925.

For example, when the home appliance 200 performs Wi-Fi communication, the mobile terminal 600 may perform scanning with respect to 13 channels for Wi-Fi communication. Particularly, the mobile terminal 600 may perform scanning from a first channel to a thirteenth channel twice.

The communication unit 222 of the home appliance 200 may receive MAC address information related to the access point device from the mobile terminal 600 through any one channel among the first to thirteenth channels, in step S930. When password information is present, the communication unit 222 may receive the password information along with the MAC address information.

The home appliance 200 may request, based on the received MAC address information of the access point device 400, that the access point device 400 transmits identifier information, encoding method information, and authentication method information. Then, the home appliance 200 may receive the identifier information, encoding method information, and authentication method information corresponding to the request.

The home appliance 200 may receive a beacon signal from the access point device 400, and extract identifier information, encoding method information, and authentication method information from the beacon signal.

The home appliance 200 may access the corresponding access point device 400 using the received identifier information, encoding method information, and authentication method information, in step S935.

More specifically, the home appliance 200 may access the access point device 400 using the MAC address information, or using the MAC address information and the password information. In addition, the home appliance 200 may access the access point device 400 using the received identifier information, encoding method information, and authentication method information.

Then, the home appliance 200 may transmit product information to the server by way of the accessed access point device, in step S930. For example, the product information may include types of products (e.g., refrigerator and washing machine), product manufacture date information, product serial number, and type/version information of firmware equipped in products.

The mobile terminal 600 may determine whether a product registration completion message is received from the server 500 within a prescribed amount of time that is determined in consideration of step S923 to step S930 of the home appliance 200, in step S965. When the product registration completion message is not received within the prescribed amount of time, step S920 may again be performed.

Upon receiving the product registration completion message, the mobile terminal 600 may display the product registration completion message on the display 651, in step S970.

Thereby, when re-executing the application related to the home appliance after product registration, the user may perform remote control by selecting a desired item, e.g., a remote control item.

Figure 9F:
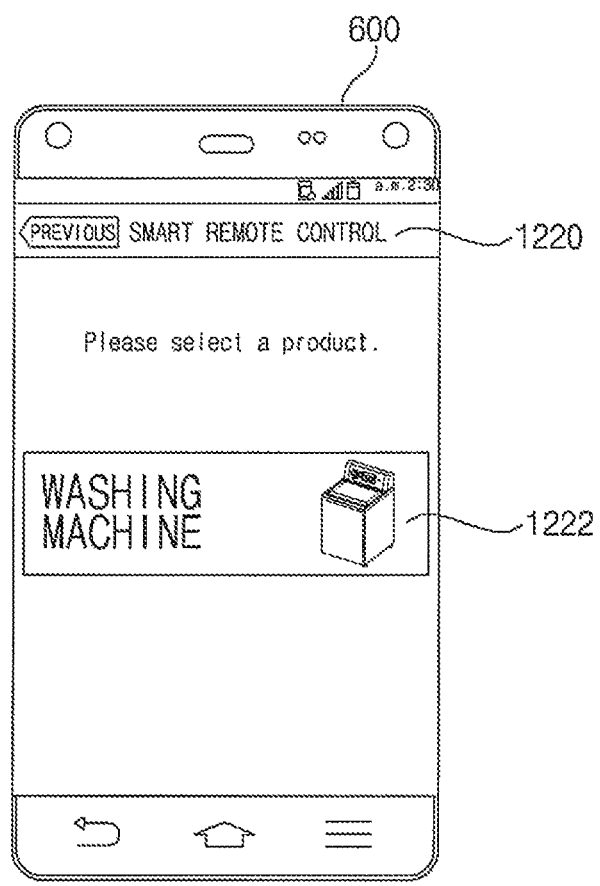

FIG. 9F illustrates display of the remote control screen in response to selection of a washing machine item 1222 when the application related to the home appliance is executed after completion of product registration. In this way, the user may simply perform product registration and, thereafter, may simply perform a desired operation.

That is, it will be appreciated that the product registration steps according to the embodiment of the present disclosure are approximately 5-6 steps as illustrated in FIGS. 9A to 9F and are considerably simplified as compared to the approximately 19 steps shown in FIGS. 6A to 6S. In this way, user convenience may be increased.

FIGS. 9A to 9F show that the access point device, which currently accesses the mobile terminal 600, may be utilized upon product registration of the home appliance 200. When attempting to set another access point device, a procedure shown in FIGS. 9G to 9I may be additionally performed.

Figure 9G:
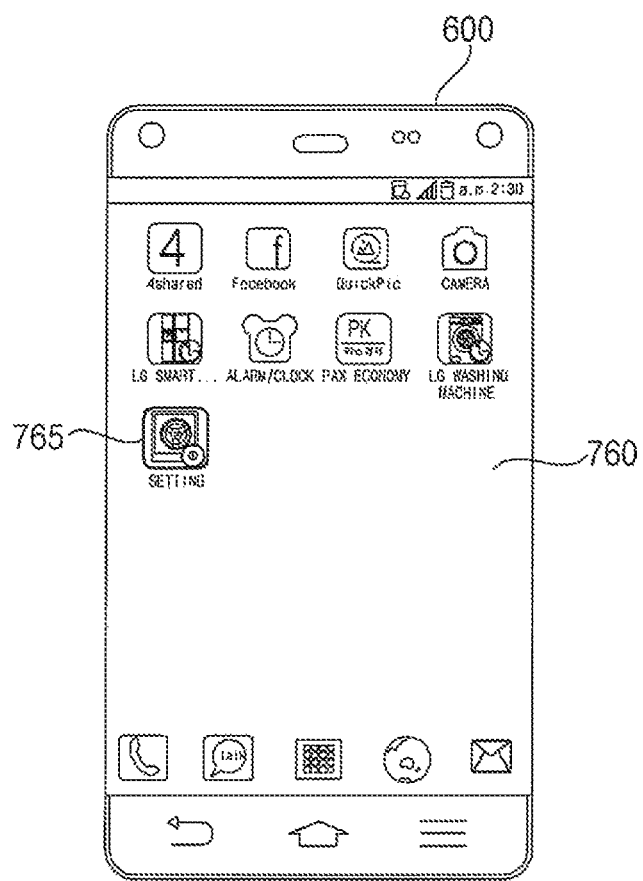

More specifically, when attempting to replace the access point device displayed on the information screen 1210 related to the access point device that the mobile terminal 600 currently accesses with another access point device, the home screen 760 may be displayed as illustrated in FIG. 9G in response to a user input to exit from the information screen 1210 or user input for display of the home screen 760.

Figure 9H:
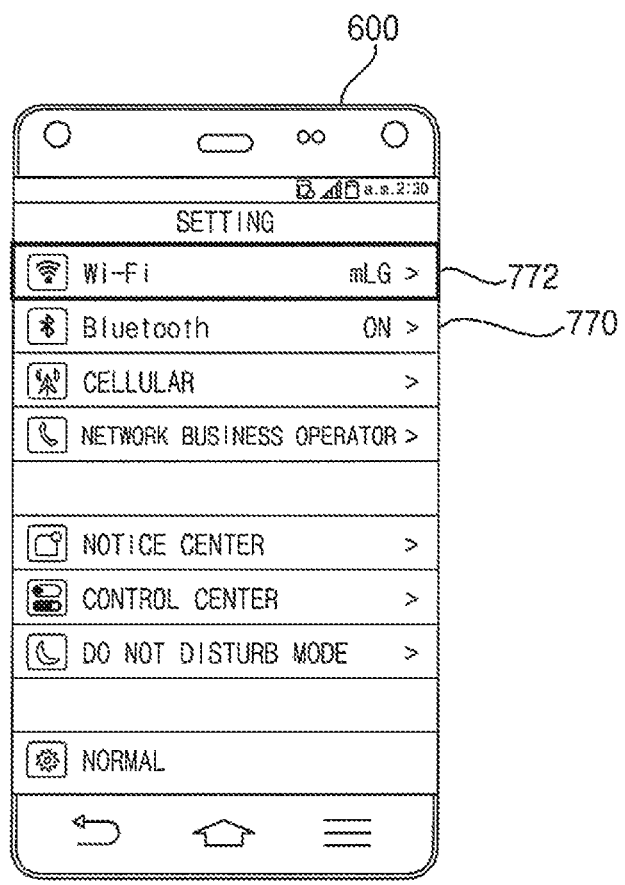

Upon selection of the setting item 765 on the home screen 760, the setting screen 770 may be displayed as illustrated in FIG. 9H. The setting screen 770 may include the access point device setting item 772. A "Wi-Fi" item may be displayed as the access point device setting item 772.

Figure 9I:
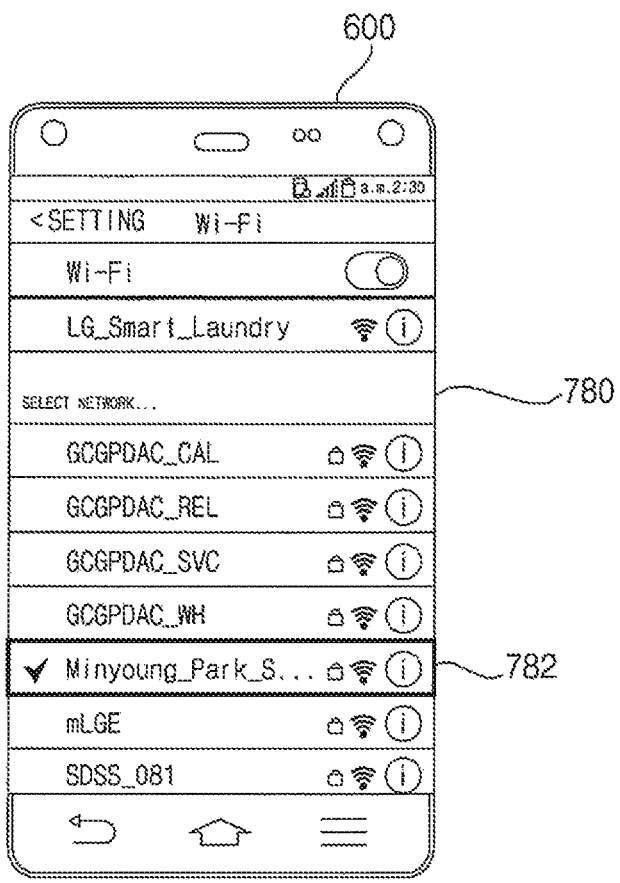
Figure 9J:
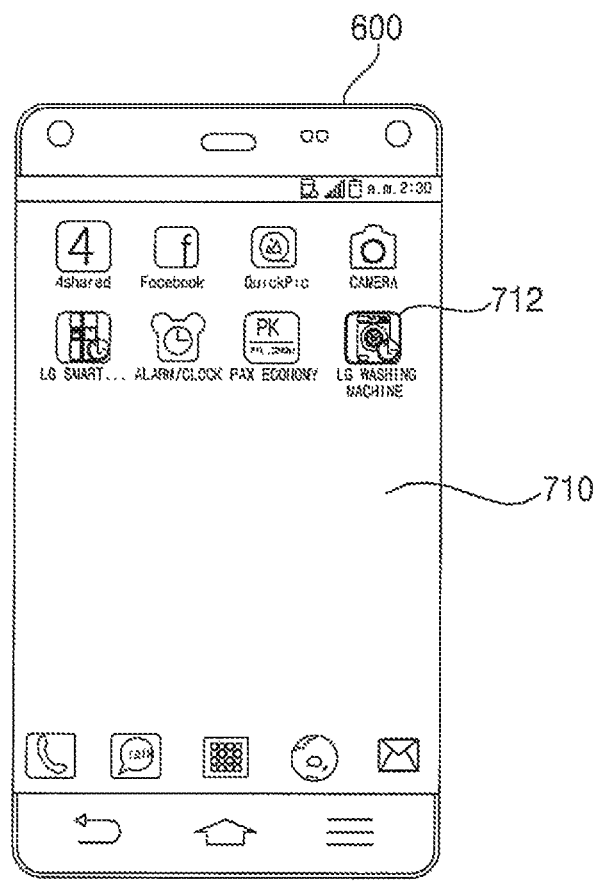

In response to an input for setting of the access point device caused by selection of the access point device setting item 772, the mobile terminal 600 may display the screen 780 for selection of the access point device as illustrated in FIG. 9I.

Then, upon selection of a specific access point device on the access point device selection screen in response to a user input, the mobile terminal 600 may set the selected access point device to an access point device that the mobile terminal 600 will access. FIG. 9I shows that access point "Minyoung_Park_S . . . " item 782 is selected.

After the mobile terminal 600 sets the access point device that the mobile terminal 600 will access, the steps as shown in FIGS. 9A to 9E may be repeated. Particularly, in FIG. 9E, the set access point device may be displayed as identifier information (SSID) 1212 of the currently accessed access point device.

Upon selection of the access point device setting item 1216, the mobile terminal 600 may externally transmit a MAC address of the access point device. The mobile terminal 600 may transmit password information along with the MAC address information related to the access point device.

More specifically, the mobile terminal 600 may transmit MAC address information of the access point device to the home appliance using a MAC frame address field.

In conclusion, even if there is no access point device that the mobile terminal 600 currently accesses, product registration may be completed via approximately 10-11 steps. Accordingly, it will be appreciated that product registration of the present disclosure is considerably simplified as compared to the product registration of approximately 19 steps as shown in FIGS. 6A to 6S. In this way, increased user convenience may be accomplished.

FIG. 8 is a view showing signal transmission flow between the server 500, the access point device 400, the mobile terminal 600, and the home appliance 200.

The mobile terminal 600 may access the access point device 400, in step S1010, and the access point device 400 may transmit identifier information (SSID) to the mobile terminal, in step S1012.

The mobile terminal 600 may execute an application related to the home appliance 200 in response to a user input. When product registration of the home appliance 200 is not completed when a login item displayed on an application execution screen is selected, the mobile terminal 600 may transmit a MAC address to the home appliance 200, in step S1020.

In Step S1020, the mobile terminal 600 may transmit a starting signal 1110, a single message 1120 including MAC address information and password information, and an ending signal 1130 to the home appliance 200.

The wireless communication unit 610 of the mobile terminal 600 may transmit the starting signal 1110 for a prescribed amount of time and, after transmission of the starting signal 1110, may transmit the message 1120 including MAC address information and password information using any one wireless channel among a plurality of wireless channels. After transmission of the message 1120, the communication unit 610 may transmit the ending signal 1130.

The starting signal 1110 may include reception MAC address information 1112 related to the home appliance 200, transmission MAC address information 1114 related to the mobile terminal 600, AP MAC address information 1116 related to the access point device 400, and a starting message 1118.

The message 1120 may include reception MAC address information 1122, transmission MAC address information 1124, AP MAC address information 1126, and password information 1128.

The ending signal 1130 may include reception MAC address information 1132, transmission MAC address information 1134, AP MAC address information 1136, and an ending message 1138.

The home appliance 200 may determine whether the starting signal 1110 is a reception signal for the home appliance 200 based on the reception MAC address information 1112, and determine whether the starting signal 1110 is a signal from the mobile terminal 600 rather than any other devices based on the transmission MAC address information 1114. In addition, the home appliance 200 may recognize that a message will subsequently be received based on the starting message 1118.

When the starting signal 1110 is transmitted via Wi-Fi communication, the wireless communication unit 610 of the mobile terminal 600 may transmit the starting signal 1110 for a time duration required to perform scanning from a first channel to a thirteenth channel a prescribed number of times, e.g., twice.

In this way, the home appliance 200 may receive the starting signal 1110 while performing scanning of all wireless channels (e.g., scanning 1) for the duration of time during which scanning from the first channel to the thirteenth channel is implemented twice.

After reception of the starting signal 1110, the home appliance 200 may perform scanning of only channel(s) that has received the starting signal 1100 (e.g., scanning 2).

During implementation of steps S1010 to S1020, the home appliance 200 may operate in a monitoring mode for reception of the MAC address information and password information of the access point device 400 from an external source.

The home appliance 200 may operate in a station mode after reception of the MAC address information and password information.

The home appliance 200 may request, based on the MAC address information and password information received from the mobile terminal 600, that the access point device 400 transmit identifier information (SSID), encoding method information, and authentication method information, in step S1035.

In response to this request, the access point device 400 may transmit the identifier information (SSID), encoding method information, and authentication method information to the home appliance 200, in step S1036.

The drawing shows that a packet 1140 including identifier information (SSID), encoding method information, and authentication method information is transmitted to the home appliance 200.

Next, the home appliance 200 may request that the home appliance 200 access the access point device 400 using the received MAC address information, identifier information, encoding method information, authentication information, and password information, in step S1037. The access point device 400 may approve access based on the received identifier information, encoding method information, authentication method information, and password information, in step S1038.

After access to the access point device 400, the home appliance 200 may transmit product information to the server 500 by way of the access point device 400, in step S1040.

In this case, the home appliance 200 may transmit MAC address information of the access point device 400, MAC address information of the mobile terminal 600, and product information to the server 500.

The server 500 may complete product registration using the received product information, and may transmit a product completion message to the mobile terminal 600 by way of the access point device 400 using the received MAC address information related to the access point device 400 and the MAC address information related to the mobile terminal 600, in step S1065. In this way, product registration of the home appliance 200 may be simply performed.

When the mobile terminal 600 is a mobile terminal using a specific operating system (OS) (e.g., iOS), the mobile terminal 600 may provide only identifier information (SSID) and cannot externally transmit password information, encoding method information, and authentication method information related to the access point device 400. In addition to the aforementioned mobile terminal using an iOS, Android OS-based mobile terminals 600 cannot externally transmit password information related to the access point device 400.

Accordingly, in the present disclosure, to enable simplified implementation of product registration even in the case of using these mobile terminals, among seven OSI layers 1300 illustrated in FIG. 10, information processing in a MAC layer 1332 included in a data link layer 1320 may be performed, rather than information processing in an application layer 1370.

In other words, MAC address information related to the access point device 400 may be transmitted from the mobile terminal 600 to the home appliance 200 as described above via the application related to the home appliance 200 stored in the mobile terminal 600.

A data field of the message 1120 to be transmitted to the home appliance 200 may be encoded according to an encoding method of the access point device 400. For example, the message 1120 to be transmitted to the home appliance 200 may be transmitted using a plurality of packets having different lengths. Here, a total length of the plurality of packets may correspond to one letter.

That is, upon transmission of the MAC address information, the wireless communication unit 610 of the mobile terminal 600 may externally transmit a plurality of packets including encoded MAC address information, the packets having different lengths.

Since a packet header has a variable length depending on an encoding method, the controller 680 of the mobile terminal 600 may add a fixed-length packet to the packet header that is variable in length according to encoding upon transmission of the starting signal, and the wireless communication unit 610 may transmit the starting signal including the packet header to which the fixed-length packet has been added.

Thereby, the controller 270 of the home appliance 200 may remove the fixed-length packet from the packet header of the received starting signal, and perform decoding of the packet header after removal of the fixed-length packet. Then, the controller 270 of the home appliance 200 may extract MAC address information from the decoded packet header.

FIG. 11 illustrates data structure for acquisition of MAC address information and the like.

First, referring to FIG. 11(a), a data packet transmitted from the mobile terminal 600 to the home appliance 200, i.e. an 802.11 based wireless MAC header 1410 is shown. The wireless MAC header 1410 may include first to fourth address information 1412, 1414, 1416 and 1418.

Referring to FIG. 11(b), information included in the wireless MAC header 1410 of FIG. 11(a) is shown. A "transmission" item 1422 included in the second address information 1414 may represent MAC address information related to the mobile terminal 600 that transmits the starting signal (STX) 1110, and a "BSS ID" item 1424 included in the third address information 1416 represents MAC address information related to the access point device 400 that the mobile terminal 600 has accessed.

The home appliance 200 may use the MAC address information related to the access point device 400 that the mobile terminal 600 has accessed for next reception of other information (e.g., identifier information, encoding method information, and authentication method information) related to the access point device 400.

Referring to FIG. 11(c), one example of a beacon signal transmitted from the access point device 400 is shown. The beacon signal may include a wireless MAC header 1430 and a frame body 1440. A "BSS ID" item 1432 included in the beacon signal 1430 may represent MAC address information related to the access point device 400.

The home appliance 200 may detect the access point device 400 that the mobile terminal 600 has accessed by comparing the "BSS ID" item 1432 in the beacon signal 1430 with the "BSS ID" item 1424 in the starting signal (STX) 1110.

The home appliance 200 may extract identifier information, encoding method information, and authentication method information from the beacon signal 1430 via an option field 1442 included in the frame body 1440.

Then, the home appliance 200 may simply access the access point device 400 using the extracted identifier information, encoding method information, and authentication method information as well as the received MAC address information.

As is apparent from the above description, according to an embodiment, when product registration of a home appliance is not completed, a mobile terminal may simply perform product registration of the home appliance by setting information, related to any one access point device among a plurality of access point devices stored therein, to an access point device with respect to the home appliance and, based on this setting, transmitting a media access control (MAC) address of the access point device to the home appliance.

Particularly, the home appliance, which has received the MAC address information, may simply perform the product registration by accessing the access point device and then access a server by way of the access point device.

When the mobile terminal further transmits password information of the access point device upon transmission of the MAC address information, this enables the home appliance to simply access the access point device.

The mobile terminal may receive a product registration completion message with respect to the home appliance from the server and display the product registration completion message, which enables the user to simply recognize completion of product registration. Accordingly, user convenience may be increased.

When the mobile terminal transmits encoded MAC address information upon transmission of the MAC address information, the mobile terminal may add a fixed-length packet to a packet header, or externally transmit a plurality of packets including the MAC address information, the packets having different lengths. In this way, the home appliance may easily grasp the MAC address information.

Upon transmission of the MAC address information, the mobile terminal may transmit a starting signal for a prescribed duration of time and, after transmission of the starting signal, may transmit a message including the MAC address information using any one wireless channel among a plurality of wireless channels. In this way, the home appliance may easily receive the MAC address information.

When the home appliance receives the MAC address of the access point device from the mobile terminal, the home appliance may receive identifier information, encoding method information, and authentication method information from the access point device based on the MAC address information, control access to the access point device using the received identifier information, encoding method information, and authentication method information, and transmit product information to the server by way of the access point device, thereby performing product registration in a simplified manner.

Particularly, based on the MAC address information, the home appliance may request that the access point device transmits identifier information, encoding method information, and authentication method information, or may receive identifier information, encoding method information, and authentication method information from a beacon signal transmitted from the access point device. In this way, the home appliance may easily access the access point device.

In addition, when the mobile terminal transmits the encoded MAC address information, the home appliance may remove the fixed-length packet from the packet header of the received starting signal, and decode the packet header after removal of the fixed-length packet, thereby easily acquiring the MAC address information.

As broadly described and embodied herein, one object of the present disclosure to provide mobile terminals, home appliances, and methods of operating the same which enable simplified implementation of product registration with respect to home appliances.

In accordance with one embodiment of the present disclosure, the above and other objects can be accomplished by the provision of a mobile terminal including a display, a wireless communication unit configured to perform data exchange with a server, or to transmit data to a home appliance, and a controller configured to control display of a screen including an application related to the home appliance in response to an execution input of the application related to the home appliance, to control setting of information, related to any one access point device among a plurality of access point devices stored in the mobile terminal, to an access point device with respect to the home appliance when product registration of the home appliance is not completed in a selected state of a login item on the application screen, to control the wireless communication unit so as to transmit a media access control (MAC) address of the access point device to the home appliance based on the setting and to control reception of a message indicating completion of product registration with respect to the home appliance from the server and display of the product registration completion message.

In accordance with another embodiment of the present disclosure, there is provided a home appliance including a drive unit, a communication unit configured to receive data from a mobile terminal, or to perform data exchange with an access point device, and a controller configured to control, upon reception of a media access control (MAC) address of the access point device from the mobile terminal, reception of identifier information, encoding method information, and authentication method information from the access point device based on the MAC address information, to control access of the home appliance to the access point device using the received identifier information, encoding method information, and authentication method information, and to control transmission of product information to a server by way of the access point device.

In accordance with another embodiment of the present disclosure, there is provided a method of operating a mobile terminal, including executing an application related to a home appliance, displaying a screen of the executed application, displaying a login item on the application screen, displaying a product registration guide screen when product registration is not completed in a selected state of the login item, displaying information related to any one access point device among a plurality of access point devices stored in the mobile terminal after display of the guide screen, setting the displayed access point device to an access point device with respect to the home appliance, externally transmitting a media access control (MAC) address of the access point device based on the setting, receiving a product registration completion message with respect to the home appliance from a server by way of the access point device, and displaying the product registration completion message.

In accordance with a further embodiment of the present disclosure, there is provided a method of operating a home appliance, including receiving a media access control (MAC) address of an access point device from a mobile terminal, receiving identifier information, encoding method information, and authentication method information from the access point device based on the MAC address information, accessing the access point device using the received identifier information, encoding method information, and authentication method information, and transmitting product information to a server by way of the access point device.

A method of operating a mobile terminal or a method of operating a home appliance according to the present disclosure may be implemented as code that may be written on a processor readable recording medium and thus read by a processor provided in the mobile terminal or the home appliance. The processor readable recording medium may be any type of recording device in which data is stored in a processor readable manner. Examples of the processor readable recording medium may include a ROM, a RAM, a CD-ROM, a magnetic tape, a floppy disc, and an optical data storage device. In addition, the processor readable recording medium includes a carrier wave (e.g., data transmission over the Internet). Also, the processor readable recording medium may be distributed over a plurality of computer systems connected to a network so that processor readable code is written thereto and executed therefrom in a decentralized manner.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a display;
   a wireless communication device configured to perform data exchange with a server, or to transmit data to a home appliance; and
   a controller configured to:
   control display of a screen including an application related to the home appliance in response to an input to execute the application related to the home appliance;
   control setting of information, related to any one access point device among a plurality of access point devices stored in the mobile terminal, for connecting to an access point device with respect to the home appliance when product registration of the home appliance is not completed when a login item is selected on the application screen;
   control the wireless communication device to transmit a media access control (MAC) address of the access point device to the home appliance based on the set information; and
   control reception of a message indicating completion of product registration with respect to the home appliance from the server and display of the product registration completion message,
   wherein the wireless communication unit is configured to transmit password information for the access point device stored in the mobile terminal, along with the MAC address information, via the home appliance application to the home appliance,
   wherein the controller is configured to perform information processing in a MAC layer included in a data link layer of open systems interconnection (OSI) layers rather than information processing in an application layer of the OSI layers for transmitting the password information.

2. The mobile terminal according to claim 1, wherein the controller is configured to:
   control display of a product registration guide screen when product registration has not been completed when the login item is selected; and
   control display of information related to any one access point device among the plurality of access point devices stored in the mobile terminal after display of the guide screen.

3. The mobile terminal according to claim 2, wherein the controller is configured to:
   control display of a home screen in response to an input to exit from the application after display of the guide screen;
   control display of a setting screen upon selection of a setting item on the home screen;
   control display of a screen for selection of the access point device in response to an access point device setting input on the setting screen;
   control, upon selection of a specific access point device on the access point device selection screen, setting of the selected access point device as an access point device for access to the home appliance; and
   execute the application related to the home appliance in response to an execution input for the application related to the home appliance on the home screen after the selected access point device is set.

4. The mobile terminal according to claim 1, wherein the MAC address information and password information of the access point device are included in a single message for transmission to the home appliance.

5. The mobile terminal according to claim 1, wherein, upon transmission of the MAC address information, the wireless communication device is configured to transmit a starting signal for a prescribed amount of time and, after transmission of the starting signal, transmit a message including the MAC address information using any one wireless channel among a plurality of wireless channels.

6. The mobile terminal according to claim 5, wherein the controller is configured to add a fixed-length packet to a packet header upon transmission of the starting signal, the packet header being variable according to encoding, and
wherein the wireless communication device is configured to transmit the starting signal including the packet header to which the fixed-length packet has been added.

7. The mobile terminal according to claim 1, wherein, upon transmission of the MAC address information, the wireless communication device is configured to externally transmit a plurality of packets including encoded MAC address information, the plurality of packets having different lengths.

8. A home appliance comprising:
a drive device configured to drive an operation of the home appliance;
a communication device configured to receive data from a mobile terminal, or to perform data exchange with an access point device; and
a controller configured to:
operate in a monitoring mode and perform scanning of all wireless channels;
receive starting signal through a first channel among the all wireless channels;
perform scanning of the first channel after reception of the starting signal;
receive a message including the a media access control (MAC) address information and password information through the first channel;
operate in a station mode after reception of the MAC address information and password information;
control, upon reception of the MAC address of the access point device from the mobile terminal, reception of identifier information, encoding method information, and authentication method information from the access point device based on the MAC address information;
control access of the home appliance to the access point device using the received identifier information, encoding method information, and authentication method information; and
control transmission of product information to a server by way of the access point device,
wherein the controller removes fixed-length packet from packet header of the received starting signal, performs decoding of the packet header after removal of the fixed-length packet, extracts the MAC address information from the decoded packet header.

9. The home appliance according to claim 8, wherein, upon reception of the MAC address information, the controller is configured to control request, based on the MAC address information, that the access point device transmits the identifier information, the encoding method information, and the authentication method information, and
wherein the communication device is configured to receive the identifier information, the encoding method information, and the authentication method information in response to the request.

10. The home appliance according to claim 8, wherein the communication device is configured to receive a beacon signal from the access point device, and
wherein the controller is configured to extract the identifier information, the encoding method information, and the authentication method information from the beacon signal.

11. The home appliance according to claim 8, wherein the communication device is configured to receive password information for the access point device from the mobile terminal upon reception of the MAC address information, and
wherein the controller is configured to control access of the home appliance to the access point device using the identifier information, the encoding method information, the authentication method information, and the password information.

12. The home appliance according to claim 8, wherein, upon reception of the MAC address information, the communication device is configured to scan a plurality of wireless channels to receive a starting signal using any one channel among the plurality of wireless channels and, after reception of the starting signal, to receive a message including the MAC address information through the corresponding channel.

13. The home appliance according to claim 12, wherein the controller is configured to:
remove a fixed-length packet from a packet header of the starting signal upon reception of the starting signal; and
decode the packet header after removal of the fixed-length packet.

14. A method of operating a mobile terminal, the method comprising:
executing, on the mobile terminal, an application related to a home appliance;
displaying, on a display by a controller, a screen of the executed application;
displaying, on the display by the controller, a login item on the application screen;
displaying, on the display by the controller, a product registration guide screen when product registration has not been completed when the login item is selected;
displaying, on the display by the controller, information related to any one access point device among a plurality of access point devices stored in the mobile terminal after display of the guide screen;
setting, by the controller, the displayed access point device as an access point device for the home appliance;
externally transmitting, at a wireless communication device, a media access control (MAC) address of the access point device based on the setting;
receiving, at the wireless communication device, a product registration completion message with respect to the home appliance from a server by way of the access point device; and
displaying, on the display by the controller, the product registration completion message,
wherein the externally transmitting the MAC address includes transmitting password information of the access point device along with the MAC address information,
wherein information processing is performed in a MAC layer included in a data link layer of open systems interconnection (OSI) layers rather than in an application layer of the OSI layers for transmitting the password information.

15. The method according to claim 14, further comprising:
- displaying a home screen in response to an input to exit from the application after display of the guide screen;
- displaying a setting screen upon selection of a setting item on the home screen;
- displaying a screen for selection of the access point device in response to an access point device setting input on the setting screen;
- setting, upon selection of a specific access point device on the access point device selection screen, the selected access point device as an access point device for access to the home appliance; and
- executing the application related to the home appliance in response to an execution input for the application related to the home appliance on the home screen after the setting.

16. A method of operating a home appliance, the method comprising:
- operating in a monitoring mode and perform scanning of all wireless channels;
- receiving starting signal through a first channel among the all wireless channels;
- performing scanning of the first channel after reception of the starting signal;
- receiving a message including the a media access control (MAC) address information and password information through the first channel;
- operating in a station mode after reception of the MAC address information and password information;
- receiving, at a communication device, a media access control (MAC) address of an access point device from a mobile terminal;
- receiving, at a controller, identifier information, encoding method information, and authentication method information from the access point device based on the MAC address information;
- accessing, by the controller, the access point device using the received identifier information, the encoding method information, and the authentication method information; and
- transmitting, at the communication device, product information to a server by way of the access point device,
- wherein fixed-length packet is removed from packet header of the received starting signal, decoding of the packet header is performed after removal of the fixed-length packet, and the MAC address information from the decoded packet header is extracted.

17. The method according to claim 16, wherein the receiving the identifier information, the encoding method information, and the authentication method information includes:
- receiving a beacon signal from the access point device; and
- the extracting identifier information, the encoding method information, and the authentication method information from the beacon signal.

18. The method according to claim 16, wherein the home appliance is configured to receive password information for the access point device from the mobile terminal upon reception of the MAC address information, and to access the access point device using the identifier information, the encoding method information, the authentication method information, and the password information.

* * * * *